US010129117B2

(12) United States Patent
Gupta et al.

(10) Patent No.: US 10,129,117 B2
(45) Date of Patent: Nov. 13, 2018

(54) CONDITIONAL POLICIES

(71) Applicant: Cisco Technology, Inc., San Jose, CA (US)

(72) Inventors: Sunil Kumar Gupta, Milpitas, CA (US); Navindra Yadav, Cupertino, CA (US); Michael Standish Watts, Mill Valley, CA (US); Ali Parandehgheibi, Sunnyvale, CA (US); Shashidhar Gandham, Fremont, CA (US); Ashutosh Kulshreshtha, Fremont, CA (US); Khawar Deen, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 188 days.

(21) Appl. No.: 15/045,210

(22) Filed: Feb. 16, 2016

(65) Prior Publication Data

US 2016/0359913 A1    Dec. 8, 2016

Related U.S. Application Data

(60) Provisional application No. 62/171,899, filed on Jun. 5, 2015.

(51) Int. Cl.
*H04L 29/06* (2006.01)
*H04L 12/26* (2006.01)
(Continued)

(52) U.S. Cl.
CPC .......... *H04L 43/045* (2013.01); *G06F 3/0482* (2013.01); *G06F 3/04842* (2013.01);
(Continued)

(58) Field of Classification Search
CPC ... H04L 43/045; H04L 63/1408; H04L 67/10; H04L 67/16; H04L 67/42; H04L 67/12;
(Continued)

(56) References Cited

U.S. PATENT DOCUMENTS 5,086,385 A    2/1992    Launey et al.
5,319,754 A    6/1994    Meinecke et al.
(Continued)

FOREIGN PATENT DOCUMENTS

CN    101093452    12/2007
CN    101770551    7/2010
(Continued)

OTHER PUBLICATIONS

Theodorakopoulos, George; Baras, John S. On Trust Models and Trust Evaluation Metrics for Ad Hoc Networks. IEEE Journal on Selected Areas in Communications. vol. 24, Issue: 2. Pub. Date: 2006. https://ieeexplore.ieee.org/stamp/stamp.jsp?tp=&arnumber=1589111.*
(Continued)

*Primary Examiner* — Jeremiah Avery
(74) *Attorney, Agent, or Firm* — Polsinelli PC

(57) ABSTRACT

Conditional policies can be defined that change based on security measurements of network endpoints. In an example embodiment, a network traffic monitoring system can monitor network flows between the endpoints and quantify how secure those endpoints are based on analysis of the network flows and other data. A conditional policy may be created that establishes one or more first connectivity policies for handling a packet when a security measurement of an endpoint is a first value or first range values, and one or more second connectivity policies for handling the packet. The connectivity policies may include permitting connectivity, denying connectivity, redirecting the packet using a specific
(Continued)

route, or other network action. When the network traffic monitoring system detects a change to the security measurement of the endpoint, one or more applicable policies can be determined and the system can update policy data for the network to enforce the policies.

20 Claims, 7 Drawing Sheets

(51) Int. Cl.
| | |
|---|---|
| G06F 9/455 | (2018.01) |
| G06F 17/30 | (2006.01) |
| H04L 12/851 | (2013.01) |
| H04L 12/24 | (2006.01) |
| H04W 84/18 | (2009.01) |
| H04L 29/08 | (2006.01) |
| G06N 99/00 | (2010.01) |
| G06F 21/53 | (2013.01) |
| H04L 12/723 | (2013.01) |
| G06F 3/0484 | (2013.01) |
| H04L 1/24 | (2006.01) |
| H04W 72/08 | (2009.01) |
| H04L 9/08 | (2006.01) |
| H04L 9/32 | (2006.01) |
| H04J 3/06 | (2006.01) |
| H04J 3/14 | (2006.01) |
| H04L 29/12 | (2006.01) |
| H04L 12/813 | (2013.01) |
| H04L 12/823 | (2013.01) |
| H04L 12/801 | (2013.01) |
| H04L 12/741 | (2013.01) |
| H04L 12/833 | (2013.01) |
| H04L 12/721 | (2013.01) |
| G06F 3/0482 | (2013.01) |
| G06T 11/20 | (2006.01) |
| H04L 12/841 | (2013.01) |
| H04L 12/725 | (2013.01) |
| H04L 12/715 | (2013.01) |
| G06F 21/55 | (2013.01) |
| G06F 21/56 | (2013.01) |

(52) U.S. Cl.
CPC ...... *G06F 3/04847* (2013.01); *G06F 9/45558* (2013.01); *G06F 17/3053* (2013.01); *G06F 17/30241* (2013.01); *G06F 17/30554* (2013.01); *G06F 17/30598* (2013.01); *G06F 17/30604* (2013.01); *G06F 17/30867* (2013.01); *G06F 21/53* (2013.01); *G06F 21/552* (2013.01); *G06F 21/566* (2013.01); *G06N 99/005* (2013.01); *G06T 11/206* (2013.01); *H04J 3/0661* (2013.01); *H04J 3/14* (2013.01); *H04L 1/242* (2013.01); *H04L 9/0866* (2013.01); *H04L 9/3239* (2013.01); *H04L 9/3242* (2013.01); *H04L 41/046* (2013.01); *H04L 41/0668* (2013.01); *H04L 41/0803* (2013.01); *H04L 41/0806* (2013.01); *H04L 41/0816* (2013.01); *H04L 41/0893* (2013.01); *H04L 41/12* (2013.01); *H04L 41/16* (2013.01); *H04L 41/22* (2013.01); *H04L 43/02* (2013.01); *H04L 43/04* (2013.01); *H04L 43/062* (2013.01); *H04L 43/08* (2013.01); *H04L 43/0805* (2013.01); *H04L 43/0811* (2013.01); *H04L 43/0829* (2013.01); *H04L 43/0841* (2013.01); *H04L 43/0858* (2013.01); *H04L 43/0864* (2013.01); *H04L 43/0876* (2013.01); *H04L 43/0882* (2013.01); *H04L 43/0888* (2013.01); *H04L 43/10* (2013.01); *H04L 43/106* (2013.01); *H04L 43/12* (2013.01); *H04L 43/16* (2013.01); *H04L 45/306* (2013.01); *H04L 45/38* (2013.01); *H04L 45/46* (2013.01); *H04L 45/507* (2013.01); *H04L 45/66* (2013.01); *H04L 45/74* (2013.01); *H04L 47/11* (2013.01); *H04L 47/20* (2013.01); *H04L 47/2441* (2013.01); *H04L 47/2483* (2013.01); *H04L 47/28* (2013.01); *H04L 47/31* (2013.01); *H04L 47/32* (2013.01); *H04L 61/2007* (2013.01); *H04L 63/0227* (2013.01); *H04L 63/0263* (2013.01); *H04L 63/06* (2013.01); *H04L 63/0876* (2013.01); *H04L 63/145* (2013.01); *H04L 63/1408* (2013.01); *H04L 63/1416* (2013.01); *H04L 63/1425* (2013.01); *H04L 63/1433* (2013.01); *H04L 63/1441* (2013.01); *H04L 63/1458* (2013.01); *H04L 63/1466* (2013.01); *H04L 63/16* (2013.01); *H04L 63/20* (2013.01); *H04L 67/10* (2013.01); *H04L 67/1002* (2013.01); *H04L 67/12* (2013.01); *H04L 67/16* (2013.01); *H04L 67/36* (2013.01); *H04L 67/42* (2013.01); *H04L 69/16* (2013.01); *H04L 69/22* (2013.01); *H04W 72/08* (2013.01); *H04W 84/18* (2013.01); *G06F 2009/4557* (2013.01); *G06F 2009/45587* (2013.01); *G06F 2009/45591* (2013.01); *G06F 2009/45595* (2013.01); *G06F 2221/033* (2013.01); *G06F 2221/2101* (2013.01); *G06F 2221/2105* (2013.01); *G06F 2221/2111* (2013.01); *G06F 2221/2115* (2013.01); *G06F 2221/2145* (2013.01); *H04L 67/22* (2013.01)

(58) Field of Classification Search
CPC ............. H04L 63/1458; H04L 63/145; H04L 63/1416; H04L 47/32; H04L 47/20; H04L 69/22; H04L 63/0876; H04L 9/3242; H04L 9/3239; H04L 9/0866; H04L 43/16; H04L 43/0829; H04L 43/0858; H04L 41/0803; H04L 41/22; H04L 67/1002; H04L 45/507; H04L 67/36; H04L 45/46; H04L 45/306; H04L 63/1466; H04L 69/16; H04L 47/28; H04L 43/02; H04L 61/2007; H04L 63/1425; H04L 63/1441; H04L 63/20; G06F 17/3053; G06F 3/04847; G06F 3/04842; G06F 17/30604; G06F 3/0482; G06F 9/45558; G06F 2009/4557; G06F 2009/45591; H04J 3/14; H04J 3/0661; G06T 11/206
See application file for complete search history.

(56) References Cited

U.S. PATENT DOCUMENTS

| | | |
|---|---|---|
| 5,400,246 A | 3/1995 | Wilson et al. |
| 5,436,909 A | 7/1995 | Dev et al. |
| 5,555,416 A | 9/1996 | Owens et al. |
| 5,726,644 A | 3/1998 | Jednacz et al. |
| 5,742,829 A | 4/1998 | Davis et al. |
| 5,831,848 A | 11/1998 | Rielly et al. |
| 5,903,545 A | 5/1999 | Sabourin et al. |
| 6,012,096 A | 1/2000 | Link et al. |
| 6,141,595 A | 10/2000 | Gloudeman et al. |
| 6,144,962 A | 11/2000 | Weinberg et al. |
| 6,239,699 B1 | 5/2001 | Ronnen |
| 6,247,058 B1 | 6/2001 | Miller et al. |
| 6,249,241 B1 | 6/2001 | Jordan et al. |

(56) References Cited

U.S. PATENT DOCUMENTS

| | | | |
|---|---|---|---|
| 6,330,562 B1 * | 12/2001 | Boden | H04L 12/4641 707/694 |
| 6,353,775 B1 | 3/2002 | Nichols | |
| 6,525,658 B2 | 2/2003 | Streetman et al. | |
| 6,611,896 B1 | 8/2003 | Mason, Jr. et al. | |
| 6,654,750 B1 | 11/2003 | Adams et al. | |
| 6,728,779 B1 | 4/2004 | Griffin et al. | |
| 6,801,878 B1 | 10/2004 | Hintz et al. | |
| 6,816,461 B1 | 11/2004 | Scrandis et al. | |
| 6,847,993 B1 | 1/2005 | Novaes et al. | |
| 6,848,106 B1 | 1/2005 | Hipp | |
| 6,925,490 B1 | 8/2005 | Novaes et al. | |
| 6,958,998 B2 | 10/2005 | Shorey | |
| 6,983,323 B2 | 1/2006 | Cantrell et al. | |
| 6,996,817 B2 | 2/2006 | Birum et al. | |
| 6,999,452 B1 | 2/2006 | Drummond-Murray et al. | |
| 7,002,464 B2 | 2/2006 | Bruemmer et al. | |
| 7,111,055 B2 | 9/2006 | Falkner | |
| 7,120,934 B2 | 10/2006 | Ishikawa | |
| 7,133,923 B2 * | 11/2006 | MeLampy | H04L 29/06027 709/231 |
| 7,181,769 B1 | 2/2007 | Keanini et al. | |
| 7,185,103 B1 | 2/2007 | Jain | |
| 7,203,740 B1 | 4/2007 | Putzolu et al. | |
| 7,302,487 B2 | 11/2007 | Ylonen et al. | |
| 7,337,206 B1 | 2/2008 | Wen et al. | |
| 7,349,761 B1 | 3/2008 | Cruse | |
| 7,353,511 B1 | 4/2008 | Ziese | |
| 7,356,679 B1 | 4/2008 | Le et al. | |
| 7,360,072 B1 | 4/2008 | Soltis et al. | |
| 7,370,092 B2 | 5/2008 | Aderton et al. | |
| 7,395,195 B2 | 7/2008 | Suenbuel et al. | |
| 7,444,404 B2 | 10/2008 | Wetherall et al. | |
| 7,466,681 B2 | 12/2008 | Ashwood-Smith et al. | |
| 7,467,205 B1 | 12/2008 | Dempster et al. | |
| 7,496,040 B2 | 2/2009 | Seo | |
| 7,496,575 B2 | 2/2009 | Buccella et al. | |
| 7,530,105 B2 | 5/2009 | Gilbert et al. | |
| 7,539,770 B2 | 5/2009 | Meier | |
| 7,568,107 B1 | 7/2009 | Rathi et al. | |
| 7,610,330 B1 | 10/2009 | Quinn et al. | |
| 7,633,942 B2 | 12/2009 | Bearden et al. | |
| 7,644,438 B1 | 1/2010 | Dash et al. | |
| 7,676,570 B2 | 3/2010 | Levy et al. | |
| 7,681,131 B1 | 3/2010 | Quarterman et al. | |
| 7,693,947 B2 | 4/2010 | Judge et al. | |
| 7,743,242 B2 | 6/2010 | Oberhaus et al. | |
| 7,752,307 B2 | 7/2010 | Takara | |
| 7,783,457 B2 | 8/2010 | Cunningham | |
| 7,787,480 B1 | 8/2010 | Mehta et al. | |
| 7,788,477 B1 | 8/2010 | Huang et al. | |
| 7,844,696 B2 | 11/2010 | Labovitz et al. | |
| 7,844,744 B2 | 11/2010 | Abercrombie et al. | |
| 7,864,707 B2 | 1/2011 | Dimitropoulos et al. | |
| 7,873,025 B2 | 1/2011 | Patel et al. | |
| 7,873,074 B1 | 1/2011 | Boland | |
| 7,874,001 B2 | 1/2011 | Beck et al. | |
| 7,885,197 B2 | 2/2011 | Metzler | |
| 7,895,649 B1 | 2/2011 | Brook et al. | |
| 7,904,420 B2 | 3/2011 | Ianni | |
| 7,930,752 B2 | 4/2011 | Hertzog et al. | |
| 7,934,248 B1 | 4/2011 | Yehuda et al. | |
| 7,957,934 B2 | 6/2011 | Greifeneder | |
| 7,961,637 B2 | 6/2011 | McBeath | |
| 7,970,946 B1 | 6/2011 | Djabarov et al. | |
| 7,975,035 B2 | 7/2011 | Popescu et al. | |
| 8,001,610 B1 * | 8/2011 | Chickering | G06F 21/00 709/225 |
| 8,005,935 B2 | 8/2011 | Pradhan et al. | |
| 8,040,232 B2 | 10/2011 | Oh et al. | |
| 8,040,822 B2 | 10/2011 | Proulx et al. | |
| 8,115,617 B2 | 2/2012 | Thubert et al. | |
| 8,135,657 B2 | 3/2012 | Kapoor et al. | |
| 8,156,430 B2 | 4/2012 | Newman | |
| 8,160,063 B2 | 4/2012 | Maltz et al. | |
| 8,179,809 B1 | 5/2012 | Eppstein et al. | |
| 8,185,824 B1 | 5/2012 | Mitchell et al. | |
| 8,239,915 B1 * | 8/2012 | Satish | G06F 21/00 713/166 |
| 8,250,657 B1 | 8/2012 | Nachenberg et al. | |
| 8,255,972 B2 | 8/2012 | Azagury et al. | |
| 8,266,697 B2 | 9/2012 | Coffman | |
| 8,281,397 B2 | 10/2012 | Vaidyanathan et al. | |
| 8,291,495 B1 | 10/2012 | Burns et al. | |
| 8,296,847 B2 | 10/2012 | Mendonca et al. | |
| 8,370,407 B1 | 2/2013 | Devarajan et al. | |
| 8,381,289 B1 | 2/2013 | Pereira et al. | |
| 8,391,270 B2 | 3/2013 | Van Der Stok et al. | |
| 8,407,164 B2 | 3/2013 | Malik et al. | |
| 8,442,073 B2 | 5/2013 | Skubacz et al. | |
| 8,451,731 B1 | 5/2013 | Lee et al. | |
| 8,462,212 B1 | 6/2013 | Kundu et al. | |
| 8,489,765 B2 | 7/2013 | Vasseur et al. | |
| 8,516,590 B1 | 8/2013 | Ranadive et al. | |
| 8,527,977 B1 | 9/2013 | Cheng et al. | |
| 8,570,861 B1 | 10/2013 | Brandwine et al. | |
| 8,572,600 B2 | 10/2013 | Chung et al. | |
| 8,572,734 B2 | 10/2013 | McConnell et al. | |
| 8,572,735 B2 | 10/2013 | Ghosh et al. | |
| 8,588,081 B2 | 11/2013 | Salam et al. | |
| 8,600,726 B1 | 12/2013 | Varshney et al. | |
| 8,615,803 B2 | 12/2013 | Dacier et al. | |
| 8,630,316 B2 | 1/2014 | Haba | |
| 8,640,086 B2 | 1/2014 | Bonev et al. | |
| 8,656,493 B2 | 2/2014 | Capalik | |
| 8,661,544 B2 | 2/2014 | Yen et al. | |
| 8,677,487 B2 | 3/2014 | Balupari et al. | |
| 8,683,389 B1 | 3/2014 | Bar-Yam et al. | |
| 8,706,914 B2 | 4/2014 | Duchesneau | |
| 8,719,452 B1 | 5/2014 | Ding et al. | |
| 8,719,835 B2 | 5/2014 | Kanso et al. | |
| 8,750,287 B2 | 6/2014 | Bui et al. | |
| 8,752,042 B2 | 6/2014 | Ratica | |
| 8,755,396 B2 | 6/2014 | Sindhu et al. | |
| 8,762,951 B1 | 6/2014 | Kosche et al. | |
| 8,769,084 B2 | 7/2014 | Westerfeld et al. | |
| 8,775,577 B1 | 7/2014 | Alford et al. | |
| 8,776,180 B2 | 7/2014 | Kumar et al. | |
| 8,812,725 B2 | 8/2014 | Kulkarni | |
| 8,813,236 B1 | 8/2014 | Saha et al. | |
| 8,825,848 B1 | 9/2014 | Dotan et al. | |
| 8,832,013 B1 | 9/2014 | Adams et al. | |
| 8,832,461 B2 | 9/2014 | Saroiu et al. | |
| 8,849,926 B2 | 9/2014 | Marzencki et al. | |
| 8,881,258 B2 | 11/2014 | Paul et al. | |
| 8,887,238 B2 | 11/2014 | Howard et al. | |
| 8,904,520 B1 | 12/2014 | Nachenberg et al. | |
| 8,908,685 B2 | 12/2014 | Patel et al. | |
| 8,914,497 B1 | 12/2014 | Xiao et al. | |
| 8,931,043 B2 | 1/2015 | Cooper et al. | |
| 8,954,610 B2 | 2/2015 | Berke et al. | |
| 8,966,021 B1 | 2/2015 | Allen | |
| 8,973,147 B2 | 3/2015 | Pearcy et al. | |
| 8,990,386 B2 | 3/2015 | He et al. | |
| 8,996,695 B2 | 3/2015 | Anderson et al. | |
| 8,997,227 B1 | 3/2015 | Mhatre et al. | |
| 9,014,047 B2 | 4/2015 | Alcala et al. | |
| 9,015,716 B2 | 4/2015 | Fletcher et al. | |
| 9,071,575 B2 | 6/2015 | Lemaster et al. | |
| 9,088,598 B1 | 7/2015 | Zhang et al. | |
| 9,110,905 B2 | 8/2015 | Polley et al. | |
| 9,130,836 B2 | 9/2015 | Kapadia et al. | |
| 9,160,764 B2 | 10/2015 | Stiansen et al. | |
| 9,178,906 B1 | 11/2015 | Chen et al. | |
| 9,197,654 B2 | 11/2015 | Ben-Shalom et al. | |
| 9,225,793 B2 | 12/2015 | Dutta et al. | |
| 9,237,111 B2 | 1/2016 | Banavalikar et al. | |
| 9,246,702 B1 | 1/2016 | Sharma et al. | |
| 9,246,773 B2 | 1/2016 | Degioanni | |
| 9,253,042 B2 | 2/2016 | Lumezanu et al. | |
| 9,258,217 B2 | 2/2016 | Duffield et al. | |
| 9,281,940 B2 | 3/2016 | Matsuda et al. | |
| 9,286,047 B1 | 3/2016 | Avramov et al. | |
| 9,317,574 B1 | 4/2016 | Brisebois et al. | |

(56) References Cited

U.S. PATENT DOCUMENTS

| | | | |
|---|---|---|---|
| 9,319,384 B2 | 4/2016 | Yan et al. | |
| 9,369,435 B2 | 6/2016 | Short et al. | |
| 9,378,068 B2 | 6/2016 | Anantharam et al. | |
| 9,405,903 B1 | 8/2016 | Xie et al. | |
| 9,417,985 B2 | 8/2016 | Baars et al. | |
| 9,418,222 B1 * | 8/2016 | Rivera | G06F 21/554 |
| 9,426,068 B2 | 8/2016 | Dunbar et al. | |
| 9,454,324 B1 | 9/2016 | Madhavapeddi | |
| 9,462,013 B1 | 10/2016 | Boss et al. | |
| 9,465,696 B2 | 10/2016 | McNeil et al. | |
| 9,501,744 B1 | 11/2016 | Brisebois et al. | |
| 9,531,589 B2 | 12/2016 | Clemm et al. | |
| 9,563,517 B1 | 2/2017 | Natanzon et al. | |
| 9,634,915 B2 | 4/2017 | Bley | |
| 9,645,892 B1 | 5/2017 | Patwardhan | |
| 9,684,453 B2 | 6/2017 | Holt et al. | |
| 9,697,033 B2 | 7/2017 | Koponen et al. | |
| 9,733,973 B2 | 8/2017 | Prasad et al. | |
| 9,749,145 B2 | 8/2017 | Banavalikar et al. | |
| 9,800,608 B2 | 10/2017 | Korsunsky et al. | |
| 9,904,584 B2 | 2/2018 | Konig et al. | |
| 2001/0028646 A1 | 10/2001 | Arts et al. | |
| 2002/0053033 A1 | 5/2002 | Cooper et al. | |
| 2002/0097687 A1 | 7/2002 | Meiri et al. | |
| 2002/0103793 A1 | 8/2002 | Koller et al. | |
| 2002/0107857 A1 | 8/2002 | Teraslinna | |
| 2002/0141343 A1 | 10/2002 | Bays | |
| 2002/0184393 A1 | 12/2002 | Leddy et al. | |
| 2003/0023601 A1 | 1/2003 | Fortier, Jr. et al. | |
| 2003/0065986 A1 | 4/2003 | Fraenkel et al. | |
| 2003/0097439 A1 | 5/2003 | Strayer et al. | |
| 2003/0126242 A1 | 7/2003 | Chang | |
| 2003/0145232 A1 | 7/2003 | Poletto et al. | |
| 2003/0151513 A1 | 8/2003 | Herrmann et al. | |
| 2003/0154399 A1 | 8/2003 | Zuk et al. | |
| 2003/0177208 A1 | 9/2003 | Harvey, IV | |
| 2004/0019676 A1 | 1/2004 | Iwatsuki et al. | |
| 2004/0030776 A1 | 2/2004 | Cantrell et al. | |
| 2004/0213221 A1 | 10/2004 | Civanlar et al. | |
| 2004/0255050 A1 | 12/2004 | Takehiro et al. | |
| 2004/0268149 A1 | 12/2004 | Aaron | |
| 2005/0028154 A1 | 2/2005 | Smith et al. | |
| 2005/0039104 A1 | 2/2005 | Shah et al. | |
| 2005/0083933 A1 | 4/2005 | Fine et al. | |
| 2005/0108331 A1 | 5/2005 | Osterman | |
| 2005/0166066 A1 | 7/2005 | Ahuja et al. | |
| 2005/0177829 A1 | 8/2005 | Vishwanath | |
| 2005/0198247 A1 | 9/2005 | Perry et al. | |
| 2005/0198371 A1 | 9/2005 | Smith et al. | |
| 2005/0198629 A1 | 9/2005 | Vishwanath | |
| 2005/0207376 A1 | 9/2005 | Ashwood-Smith et al. | |
| 2005/0257244 A1 | 11/2005 | Joly et al. | |
| 2005/0289244 A1 | 12/2005 | Sahu et al. | |
| 2006/0048218 A1 | 3/2006 | Lingafelt et al. | |
| 2006/0077909 A1 | 4/2006 | Saleh et al. | |
| 2006/0080733 A1 | 4/2006 | Khosmood et al. | |
| 2006/0095968 A1 | 5/2006 | Portolani et al. | |
| 2006/0143432 A1 | 6/2006 | Rothman et al. | |
| 2006/0156408 A1 | 7/2006 | Himberger et al. | |
| 2006/0159032 A1 | 7/2006 | Ukrainetz et al. | |
| 2006/0173912 A1 | 8/2006 | Lindvall et al. | |
| 2006/0195448 A1 | 8/2006 | Newport | |
| 2006/0272018 A1 | 11/2006 | Fouant | |
| 2006/0274659 A1 | 12/2006 | Ouderkirk | |
| 2006/0280179 A1 | 12/2006 | Meier | |
| 2006/0294219 A1 | 12/2006 | Ogawa et al. | |
| 2007/0025306 A1 | 2/2007 | Cox et al. | |
| 2007/0044147 A1 | 2/2007 | Choi et al. | |
| 2007/0097976 A1 | 5/2007 | Wood et al. | |
| 2007/0118654 A1 | 5/2007 | Jamkhedkar et al. | |
| 2007/0127491 A1 | 6/2007 | Verzijp et al. | |
| 2007/0162420 A1 | 7/2007 | Ou et al. | |
| 2007/0169179 A1 | 7/2007 | Narad | |
| 2007/0195729 A1 | 8/2007 | Li et al. | |
| 2007/0195794 A1 | 8/2007 | Fujita et al. | |
| 2007/0195797 A1 | 8/2007 | Patel et al. | |
| 2007/0201474 A1 | 8/2007 | Isobe | |
| 2007/0211637 A1 | 9/2007 | Mitchell | |
| 2007/0214348 A1 | 9/2007 | Danielsen | |
| 2007/0230415 A1 | 10/2007 | Malik | |
| 2007/0250930 A1 | 10/2007 | Aziz et al. | |
| 2007/0300061 A1 | 12/2007 | Kim et al. | |
| 2008/0022385 A1 | 1/2008 | Crowell et al. | |
| 2008/0046708 A1 | 2/2008 | Fitzgerald et al. | |
| 2008/0082662 A1 | 4/2008 | Danliker et al. | |
| 2008/0101234 A1 | 5/2008 | Nakil et al. | |
| 2008/0120350 A1 | 5/2008 | Grabowski et al. | |
| 2008/0126534 A1 | 5/2008 | Mueller et al. | |
| 2008/0155245 A1 | 6/2008 | Lipscombe et al. | |
| 2008/0250122 A1 | 10/2008 | Zsigmond et al. | |
| 2008/0270199 A1 | 10/2008 | Chess et al. | |
| 2008/0295163 A1 | 11/2008 | Kang | |
| 2008/0301765 A1 | 12/2008 | Nicol et al. | |
| 2009/0059934 A1 | 3/2009 | Aggarwal et al. | |
| 2009/0064332 A1 | 3/2009 | Porras et al. | |
| 2009/0241170 A1 | 9/2009 | Kumar et al. | |
| 2009/0300180 A1 | 12/2009 | Dehaan et al. | |
| 2009/0307753 A1 | 12/2009 | Dupont et al. | |
| 2009/0313373 A1 | 12/2009 | Hanna et al. | |
| 2009/0313698 A1 | 12/2009 | Wahl | |
| 2009/0328219 A1 | 12/2009 | Narayanaswamy | |
| 2010/0005288 A1 | 1/2010 | Rao et al. | |
| 2010/0049839 A1 | 2/2010 | Parker et al. | |
| 2010/0077445 A1 | 3/2010 | Schneider et al. | |
| 2010/0095293 A1 | 4/2010 | O'Neill et al. | |
| 2010/0095367 A1 | 4/2010 | Narayanaswamy | |
| 2010/0095377 A1 | 4/2010 | Krywaniuk | |
| 2010/0138526 A1 | 6/2010 | DeHaan et al. | |
| 2010/0138810 A1 | 6/2010 | Komatsu et al. | |
| 2010/0148940 A1 | 6/2010 | Gelvin et al. | |
| 2010/0153316 A1 | 6/2010 | Duffield et al. | |
| 2010/0153696 A1 * | 6/2010 | Beachem | G06F 9/4406 713/2 |
| 2010/0180016 A1 | 7/2010 | Bugwadia et al. | |
| 2010/0220584 A1 | 9/2010 | DeHaan et al. | |
| 2010/0235514 A1 * | 9/2010 | Beachem | G06F 21/57 709/227 |
| 2010/0235879 A1 | 9/2010 | Burnside et al. | |
| 2010/0235915 A1 | 9/2010 | Memon et al. | |
| 2010/0287266 A1 | 11/2010 | Asati et al. | |
| 2010/0303240 A1 * | 12/2010 | Beachem | G06F 21/57 380/277 |
| 2010/0306180 A1 * | 12/2010 | Johnson | G06F 17/30085 707/695 |
| 2010/0319060 A1 | 12/2010 | Aiken et al. | |
| 2011/0010585 A1 | 1/2011 | Bugenhagen et al. | |
| 2011/0022641 A1 | 1/2011 | Werth et al. | |
| 2011/0055381 A1 | 3/2011 | Narasimhan et al. | |
| 2011/0055388 A1 | 3/2011 | Yumerefendi et al. | |
| 2011/0066719 A1 | 3/2011 | Miryanov et al. | |
| 2011/0069685 A1 | 3/2011 | Tofighbakhsh | |
| 2011/0083125 A1 | 4/2011 | Komatsu et al. | |
| 2011/0103259 A1 | 5/2011 | Aybay et al. | |
| 2011/0107074 A1 | 5/2011 | Chan et al. | |
| 2011/0107331 A1 | 5/2011 | Evans et al. | |
| 2011/0126275 A1 | 5/2011 | Anderson et al. | |
| 2011/0145885 A1 | 6/2011 | Rivers et al. | |
| 2011/0153811 A1 | 6/2011 | Jeong et al. | |
| 2011/0158088 A1 | 6/2011 | Lofstrand et al. | |
| 2011/0170860 A1 | 7/2011 | Smith et al. | |
| 2011/0173490 A1 | 7/2011 | Narayanaswamy et al. | |
| 2011/0185423 A1 | 7/2011 | Sallam | |
| 2011/0196957 A1 | 8/2011 | Ayachitula et al. | |
| 2011/0202655 A1 | 8/2011 | Sharma et al. | |
| 2011/0214174 A1 | 9/2011 | Herzog et al. | |
| 2011/0225207 A1 | 9/2011 | Subramanian et al. | |
| 2011/0228696 A1 | 9/2011 | Agarwal et al. | |
| 2011/0246663 A1 | 10/2011 | Melsen et al. | |
| 2011/0302652 A1 | 12/2011 | Westerfeld | |
| 2011/0314148 A1 | 12/2011 | Petersen et al. | |
| 2012/0005542 A1 | 1/2012 | Petersen et al. | |
| 2012/0079592 A1 | 3/2012 | Pandrangi | |
| 2012/0089664 A1 | 4/2012 | Igelka | |
| 2012/0102361 A1 | 4/2012 | Sass et al. | |

(56) References Cited

U.S. PATENT DOCUMENTS

| | | |
|---|---|---|
| 2012/0102543 A1 | 4/2012 | Kohli et al. |
| 2012/0117226 A1 | 5/2012 | Tanaka et al. |
| 2012/0136996 A1 | 5/2012 | Seo et al. |
| 2012/0137278 A1 | 5/2012 | Draper et al. |
| 2012/0140626 A1 | 6/2012 | Anand et al. |
| 2012/0195198 A1 | 8/2012 | Regan |
| 2012/0197856 A1 | 8/2012 | Banka et al. |
| 2012/0198541 A1 | 8/2012 | Reeves |
| 2012/0216271 A1 | 8/2012 | Cooper et al. |
| 2012/0218989 A1 | 8/2012 | Tanabe et al. |
| 2012/0219004 A1 | 8/2012 | Balus et al. |
| 2012/0233348 A1 | 9/2012 | Winters |
| 2012/0233473 A1 | 9/2012 | Vasseur et al. |
| 2012/0240232 A1 | 9/2012 | Azuma |
| 2012/0246303 A1 | 9/2012 | Petersen et al. |
| 2012/0254109 A1 | 10/2012 | Shukla et al. |
| 2012/0260227 A1 | 10/2012 | Shukla et al. |
| 2012/0278021 A1 | 11/2012 | Lin et al. |
| 2012/0281700 A1 | 11/2012 | Koganti et al. |
| 2013/0003538 A1 | 1/2013 | Greenburg et al. |
| 2013/0003733 A1 | 1/2013 | Venkatesan et al. |
| 2013/0006935 A1 | 1/2013 | Grisby |
| 2013/0007435 A1 | 1/2013 | Bayani |
| 2013/0038358 A1 | 2/2013 | Cook et al. |
| 2013/0054682 A1* | 2/2013 | Malik ............... G06F 8/60 709/203 |
| 2013/0086272 A1 | 4/2013 | Chen et al. |
| 2013/0103827 A1 | 4/2013 | Dunlap et al. |
| 2013/0107709 A1 | 5/2013 | Campbell et al. |
| 2013/0124807 A1 | 5/2013 | Nielsen et al. |
| 2013/0125107 A1 | 5/2013 | Bandakka et al. |
| 2013/0145099 A1 | 6/2013 | Liu et al. |
| 2013/0148663 A1 | 6/2013 | Xiong |
| 2013/0159999 A1 | 6/2013 | Chiueh et al. |
| 2013/0179487 A1 | 7/2013 | Lubetzky et al. |
| 2013/0179879 A1 | 7/2013 | Zhang et al. |
| 2013/0198517 A1* | 8/2013 | Mazzarella ......... H04L 63/0428 713/168 |
| 2013/0198839 A1 | 8/2013 | Wei et al. |
| 2013/0201986 A1 | 8/2013 | Sajassi et al. |
| 2013/0205293 A1 | 8/2013 | Levijarvi et al. |
| 2013/0219161 A1 | 8/2013 | Fontignie et al. |
| 2013/0232498 A1 | 9/2013 | Mangtani et al. |
| 2013/0242999 A1 | 9/2013 | Kamble et al. |
| 2013/0246925 A1 | 9/2013 | Ahuja et al. |
| 2013/0247201 A1 | 9/2013 | Alperovitch et al. |
| 2013/0254879 A1 | 9/2013 | Chesla et al. |
| 2013/0268994 A1 | 10/2013 | Cooper et al. |
| 2013/0275579 A1 | 10/2013 | Hernandez et al. |
| 2013/0283374 A1 | 10/2013 | Zisapel et al. |
| 2013/0290521 A1 | 10/2013 | Labovitz |
| 2013/0297771 A1 | 11/2013 | Osterloh et al. |
| 2013/0301472 A1 | 11/2013 | Allan |
| 2013/0304900 A1 | 11/2013 | Trabelsi et al. |
| 2013/0305369 A1 | 11/2013 | Karta et al. |
| 2013/0318357 A1 | 11/2013 | Abraham et al. |
| 2013/0326623 A1 | 12/2013 | Kruglick |
| 2013/0333029 A1 | 12/2013 | Chesla et al. |
| 2013/0336164 A1 | 12/2013 | Yang et al. |
| 2013/0346736 A1 | 12/2013 | Cook et al. |
| 2013/0347103 A1 | 12/2013 | Veteikis et al. |
| 2014/0006610 A1 | 1/2014 | Formby et al. |
| 2014/0006871 A1 | 1/2014 | Lakshmanan et al. |
| 2014/0012814 A1 | 1/2014 | Bercovici et al. |
| 2014/0019972 A1 | 1/2014 | Yahalom et al. |
| 2014/0033193 A1 | 1/2014 | Palaniappan |
| 2014/0040343 A1 | 2/2014 | Nickolov et al. |
| 2014/0047185 A1 | 2/2014 | Peterson et al. |
| 2014/0047372 A1 | 2/2014 | Gnezdov et al. |
| 2014/0059200 A1 | 2/2014 | Nguyen et al. |
| 2014/0074946 A1 | 3/2014 | Dirstine et al. |
| 2014/0089494 A1 | 3/2014 | Dasari et al. |
| 2014/0092884 A1 | 4/2014 | Murphy et al. |
| 2014/0096058 A1 | 4/2014 | Molesky et al. |
| 2014/0105029 A1 | 4/2014 | Jain et al. |
| 2014/0115219 A1 | 4/2014 | Ajanovic et al. |
| 2014/0137109 A1 | 5/2014 | Sharma et al. |
| 2014/0140244 A1 | 5/2014 | Kapadia et al. |
| 2014/0143825 A1 | 5/2014 | Behrendt et al. |
| 2014/0149490 A1 | 5/2014 | Luxenberg et al. |
| 2014/0156814 A1* | 6/2014 | Barabash ........... H04L 41/0803 709/220 |
| 2014/0156861 A1 | 6/2014 | Cruz-Aguilar et al. |
| 2014/0164607 A1 | 6/2014 | Bai et al. |
| 2014/0165200 A1 | 6/2014 | Singla |
| 2014/0173623 A1 | 6/2014 | Chang et al. |
| 2014/0192639 A1 | 7/2014 | Smirnov |
| 2014/0201717 A1 | 7/2014 | Mascaro et al. |
| 2014/0215573 A1 | 7/2014 | Cepuran |
| 2014/0215621 A1 | 7/2014 | Xaypanya et al. |
| 2014/0280499 A1 | 9/2014 | Basavaiah et al. |
| 2014/0281030 A1 | 9/2014 | Cui et al. |
| 2014/0286354 A1 | 9/2014 | Van De Poel et al. |
| 2014/0289854 A1 | 9/2014 | Mahvi |
| 2014/0298461 A1 | 10/2014 | Hohndel et al. |
| 2014/0317278 A1 | 10/2014 | Kersch et al. |
| 2014/0317737 A1 | 10/2014 | Shin et al. |
| 2014/0331276 A1 | 11/2014 | Frascadore et al. |
| 2014/0331280 A1 | 11/2014 | Porras et al. |
| 2014/0331304 A1 | 11/2014 | Wong |
| 2014/0351203 A1 | 11/2014 | Kunnatur et al. |
| 2014/0351415 A1 | 11/2014 | Harrigan et al. |
| 2014/0359695 A1 | 12/2014 | Chari et al. |
| 2015/0006714 A1 | 1/2015 | Jain |
| 2015/0009840 A1 | 1/2015 | Pruthi et al. |
| 2015/0033305 A1 | 1/2015 | Shear et al. |
| 2015/0036480 A1 | 2/2015 | Huang et al. |
| 2015/0036533 A1 | 2/2015 | Sodhi et al. |
| 2015/0039751 A1 | 2/2015 | Harrigan et al. |
| 2015/0046882 A1 | 2/2015 | Menyhart et al. |
| 2015/0058976 A1 | 2/2015 | Carney et al. |
| 2015/0067143 A1 | 3/2015 | Babakhan et al. |
| 2015/0082151 A1 | 3/2015 | Liang et al. |
| 2015/0085665 A1 | 3/2015 | Kompella et al. |
| 2015/0095332 A1 | 4/2015 | Beisiegel et al. |
| 2015/0112933 A1 | 4/2015 | Satapathy |
| 2015/0113133 A1 | 4/2015 | Srinivas et al. |
| 2015/0124608 A1 | 5/2015 | Agarwal et al. |
| 2015/0138993 A1 | 5/2015 | Forster et al. |
| 2015/0142962 A1 | 5/2015 | Srinivas et al. |
| 2015/0195291 A1 | 7/2015 | Zuk et al. |
| 2015/0222939 A1 | 8/2015 | Gallant et al. |
| 2015/0249622 A1 | 9/2015 | Phillips et al. |
| 2015/0256555 A1 | 9/2015 | Choi et al. |
| 2015/0261842 A1 | 9/2015 | Huang et al. |
| 2015/0261886 A1 | 9/2015 | Wu et al. |
| 2015/0271008 A1 | 9/2015 | Jain et al. |
| 2015/0271271 A1 | 9/2015 | Mackay et al. |
| 2015/0295945 A1 | 10/2015 | Canzanese, Jr. et al. |
| 2015/0312233 A1* | 10/2015 | Graham, III ............ H04L 9/006 713/171 |
| 2015/0347554 A1 | 12/2015 | Vasantham et al. |
| 2015/0358352 A1 | 12/2015 | Chasin et al. |
| 2016/0006753 A1 | 1/2016 | McDaid et al. |
| 2016/0019030 A1 | 1/2016 | Shukla et al. |
| 2016/0021131 A1 | 1/2016 | Heilig |
| 2016/0026552 A1 | 1/2016 | Holden et al. |
| 2016/0036636 A1 | 2/2016 | Erickson et al. |
| 2016/0036837 A1 | 2/2016 | Jain et al. |
| 2016/0050132 A1 | 2/2016 | Zhang et al. |
| 2016/0072815 A1 | 3/2016 | Rieke et al. |
| 2016/0080414 A1 | 3/2016 | Kolton et al. |
| 2016/0087861 A1 | 3/2016 | Kuan et al. |
| 2016/0094394 A1 | 3/2016 | Sharma et al. |
| 2016/0103692 A1 | 4/2016 | Guntaka et al. |
| 2016/0105350 A1 | 4/2016 | Greifeneder et al. |
| 2016/0112284 A1 | 4/2016 | Pon et al. |
| 2016/0119234 A1 | 4/2016 | Valencia Lopez et al. |
| 2016/0127395 A1 | 5/2016 | Underwood et al. |
| 2016/0147585 A1 | 5/2016 | Konig et al. |
| 2016/0162308 A1 | 6/2016 | Chen et al. |
| 2016/0162312 A1 | 6/2016 | Doherty et al. |
| 2016/0173535 A1 | 6/2016 | Barabash et al. |
| 2016/0205002 A1 | 7/2016 | Rieke et al. |

(56) References Cited

U.S. PATENT DOCUMENTS

| | | |
|---|---|---|
| 2016/0216994 A1 | 7/2016 | Sefidcon et al. |
| 2016/0217022 A1 | 7/2016 | Velipasaoglu et al. |
| 2016/0269442 A1 | 9/2016 | Shieh |
| 2016/0269482 A1 | 9/2016 | Jamjoom et al. |
| 2016/0294691 A1 | 10/2016 | Joshi |
| 2016/0308908 A1 | 10/2016 | Kirby et al. |
| 2016/0337204 A1 | 11/2016 | Dubey et al. |
| 2016/0357424 A1 | 12/2016 | Pang et al. |
| 2016/0357546 A1 | 12/2016 | Chang et al. |
| 2016/0357587 A1 | 12/2016 | Yadav et al. |
| 2016/0357957 A1 | 12/2016 | Deen et al. |
| 2016/0359592 A1 | 12/2016 | Kulshreshtha et al. |
| 2016/0359628 A1 | 12/2016 | Singh et al. |
| 2016/0359658 A1 | 12/2016 | Yadav et al. |
| 2016/0359673 A1 | 12/2016 | Gupta et al. |
| 2016/0359677 A1 | 12/2016 | Kulshreshtha et al. |
| 2016/0359678 A1 | 12/2016 | Madani et al. |
| 2016/0359679 A1 | 12/2016 | Parasdehgheibi et al. |
| 2016/0359680 A1 | 12/2016 | Parasdehgheibi et al. |
| 2016/0359686 A1 | 12/2016 | Parasdehgheibi et al. |
| 2016/0359695 A1 | 12/2016 | Yadav et al. |
| 2016/0359696 A1 | 12/2016 | Yadav et al. |
| 2016/0359697 A1 | 12/2016 | Scheib et al. |
| 2016/0359698 A1 | 12/2016 | Deen et al. |
| 2016/0359699 A1 | 12/2016 | Gandham et al. |
| 2016/0359700 A1 | 12/2016 | Pang et al. |
| 2016/0359701 A1 | 12/2016 | Pang et al. |
| 2016/0359703 A1 | 12/2016 | Gandham et al. |
| 2016/0359704 A1 | 12/2016 | Gandham et al. |
| 2016/0359705 A1 | 12/2016 | Parasdehgheibi et al. |
| 2016/0359708 A1 | 12/2016 | Gandham et al. |
| 2016/0359709 A1 | 12/2016 | Deen et al. |
| 2016/0359711 A1 | 12/2016 | Deen et al. |
| 2016/0359712 A1 | 12/2016 | Alizadeh Attar et al. |
| 2016/0359740 A1 | 12/2016 | Parasdehgheibi et al. |
| 2016/0359759 A1 | 12/2016 | Singh et al. |
| 2016/0359872 A1 | 12/2016 | Yadav et al. |
| 2016/0359877 A1 | 12/2016 | Kulshreshtha et al. |
| 2016/0359878 A1 | 12/2016 | Prasad et al. |
| 2016/0359879 A1 | 12/2016 | Deen et al. |
| 2016/0359880 A1 | 12/2016 | Pang et al. |
| 2016/0359881 A1 | 12/2016 | Yadav et al. |
| 2016/0359888 A1 | 12/2016 | Gupta et al. |
| 2016/0359889 A1 | 12/2016 | Yadav et al. |
| 2016/0359890 A1 | 12/2016 | Deen et al. |
| 2016/0359891 A1 | 12/2016 | Pang et al. |
| 2016/0359897 A1 | 12/2016 | Yadav et al. |
| 2016/0359905 A1 | 12/2016 | Touboul et al. |
| 2016/0359912 A1 | 12/2016 | Gupta et al. |
| 2016/0359914 A1 | 12/2016 | Deen et al. |
| 2016/0359915 A1 | 12/2016 | Gupta et al. |
| 2016/0359917 A1 | 12/2016 | Rao et al. |
| 2016/0373481 A1 | 12/2016 | Sultan et al. |
| 2017/0024453 A1 | 1/2017 | Raja et al. |
| 2017/0034018 A1 | 2/2017 | Parasdehgheibi et al. |
| 2017/0048121 A1 | 2/2017 | Hobbs et al. |
| 2017/0070582 A1 | 3/2017 | Desai et al. |
| 2017/0085483 A1 | 3/2017 | Mihaly et al. |
| 2017/0208487 A1 | 7/2017 | Ratakonda et al. |
| 2017/0250880 A1 | 8/2017 | Akens et al. |
| 2017/0250951 A1 | 8/2017 | Wang et al. |
| 2017/0289067 A1 | 10/2017 | Lu et al. |
| 2017/0295141 A1 | 10/2017 | Thubert et al. |
| 2017/0302691 A1 | 10/2017 | Singh et al. |
| 2017/0331747 A1 | 11/2017 | Singh et al. |
| 2017/0346736 A1 | 11/2017 | Chander et al. |
| 2017/0364380 A1 | 12/2017 | Frye, Jr. et al. |
| 2018/0006911 A1 | 1/2018 | Dickey |
| 2018/0007115 A1 | 1/2018 | Nedeltchev et al. |
| 2018/0013670 A1 | 1/2018 | Kapadia et al. |
| 2018/0145906 A1 | 5/2018 | Yadav et al. |

FOREIGN PATENT DOCUMENTS

| | | |
|---|---|---|
| CN | 102521537 | 6/2012 |
| CN | 103023970 | 4/2013 |
| CN | 103716137 | 4/2014 |
| CN | 104065518 | 9/2014 |
| CN | 107196807 | 9/2017 |
| EP | 0811942 | 12/1997 |
| EP | 1076848 | 7/2002 |
| EP | 1383261 | 1/2004 |
| EP | 1450511 | 8/2004 |
| EP | 2045974 | 4/2008 |
| EP | 2043320 | 4/2009 |
| EP | 2860912 | 4/2015 |
| EP | 2887595 | 6/2015 |
| JP | 2009-016906 | 1/2009 |
| KR | 1394338 | 5/2014 |
| WO | WO 2007/014314 | 2/2007 |
| WO | WO 2007/070711 | 6/2007 |
| WO | WO 2008/069439 | 6/2008 |
| WO | WO 2013/030830 | 3/2013 |
| WO | WO 2015/042171 | 3/2015 |
| WO | WO 2016/004075 | 1/2016 |
| WO | WO 2016/019523 | 2/2016 |

OTHER PUBLICATIONS

Zeng, Sai et al. Managing Risk in Multi-node Automation of Endpoint Management. 2014 IEEE Network Operations and Management Symposium (NOMS). Pub. Date: 2014. https://ieeexplore.ieee.org/stamp/stamp.jsp?tp=&arnumber=6838295.*
Baek, Kwang-Hyun; Smith, Sean W. Preventing Theft of Quality of Service on Open Platforms. 2005 Workshop of the 1st International Conference on Security and Privacy for Emerging Areas in Communication Networks. Pub. Date: 2005. https://ieeexplore.ieee.org/stamp/stamp.jsp?tp=&arnumber=1588319.*
Australian Government Department of Defence, Intelligence and Security, "Top 4 Strategies to Mitigate Targeted Cyber Intrusions," Cyber Security Operations Centre Jul. 2013, http://www.asd.gov.au/infosec/top-mitigations/top-4-strategies-explained.htm.
Author Unknown, "Blacklists & Dynamic Reputation: Understanding Why the Evolving Threat Eludes Blacklists," www.dambala.com, 9 pages, Dambala, Atlanta, GA, USA.
Aydin, Galip, et al., "Architecture and Implementation of a Scalable Sensor Data Storage and Analysis Using Cloud Computing and Big Data Technologies," Journal of Sensors, vol. 2015, Article ID 834217, Feb. 2015, 11 pages.
Backes, Michael, et al., "Data Lineage in Malicious Environments," IEEE 2015, pp. 1-13.
Bayati, Mohsen, et al., "Message-Passing Algorithms for Sparse Network Alignment," Mar. 2013, 31 pages.
Berezinski, Przemyslaw, et al., "An Entropy-Based Network Anomaly Detection Method," Entropy, 2015, vol. 17, www.mdpi.com/journal/entropy, pp. 2367-2408.
Berthier, Robin, et al. "Nfsight: Netflow-based Network Awareness Tool," 2010, 16 pages.
Bhuyan, Dhiraj, "Fighting Bots and Botnets," 2006, pp. 23-28.
Blair, Dana, et al., U.S. Appl. No. 62/106,006, filed Jan. 21, 2015, entitled "Monitoring Network Policy Compliance."
Chandran, Midhun, et al., "Monitoring in a Virtualized Environment," GSTF International Journal on Computing, vol. 1, No. 1, Aug. 2010.
Chari, Suresh, et al., "Ensuring continuous compliance through reconciling policy with usage," Proceedings of the 18th ACM symposium on Access control models and technologies (SACMAT '13). ACM, New York, NY, USA, 49-60.
Chen, Xu, et al., "Automating network application dependency discovery: experiences, limitations, and new solutions," 8th USENIX conference on Operating systems design and implementation (OSDI'08), USENIX Association, Berkeley, CA, USA, 117-130.
Cisco Systems, "Cisco Network Analysis Modules (NAM) Tutorial," Cisco Systems, Inc., Version 3.5.
Cisco Systems, Inc., "Addressing Compliance from One Infrastructure: Cisco Unified Compliance Solution Framework," 2014.

(56) References Cited

OTHER PUBLICATIONS

Cisco Systems, Inc., "Cisco Application Dependency Mapping Service," 2009.
Cisco Systems, Inc., "White Paper—New Cisco Technologies Help Customers Achieve Regulatory Compliance," 1992-2008.
Cisco Systems, Inc., "A Cisco Guide to Defending Against Distributed Denial of Service Attacks," May 3, 2016, 34 pages.
Di Lorenzo, Guisy, et al., "EXSED: An Intelligent Tool for Exploration of Social Events Dynamics from Augmented Trajectories," Mobile Data Management (MDM), pp. 323-330, Jun. 3-6, 2013.
Feinstein, Laura, et al., "Statistical Approaches to DDoS Attack Detection and Response," Proceedings of the DARPA Information Survivability Conference and Exposition (DISCEX '03), Apr. 2003, 12 pages.
George, Ashley, et al., "NetPal: A Dynamic Network Administration Knowledge Base," 2008, pp. 1-14.
Goldsteen, Abigail, et al., "A Tool for Monitoring and Maintaining System Trustworthiness at Run Time," REFSQ (2015), pp. 142-147.
Hamadi, S., et al., "Fast Path Acceleration for Open vSwitch in Overlay Networks," Global Information Infrastructure and Networking Symposium (GIIS), Montreal, QC, pp. 1-5, Sep. 15-19, 2014.
Hewlett-Packard, "Effective use of reputation intelligence in a security operations center," Jul. 2013, 6 pages.
Hideshima, Yusuke, et al., "STARMINE: A Visualization System for Cyber Attacks," https://www.researchgate.net/publication/221536306, Feb. 2006, 9 pages.
InternetPerils, Inc., "Control Your Internet Business Risk," 2003-2015, http://www.internetperils.com.
Janoff, Christian, et al., "Cisco Compliance Solution for HIPAA Security Rule Design and Implementation Guide," Cisco Systems, Inc., Updated Nov. 14, 2015, part 1 of 2, 350 pages.
Janoff, Christian, et al., "Cisco Compliance Solution for HIPAA Security Rule Design and Implementation Guide," Cisco Systems, Inc., Updated Nov. 14, 2015, part 2 of 2, 588 pages.
Kerrison, Adam, et al., "Four Steps to Faster, Better Application Dependency Mapping—Laying the Foundation for Effective Business Service Models," BMCSoftware, 2011.
Kraemer, Brian, "Get to know your data center with CMDB," TechTarget, Apr. 5, 2006, http://searchdatacenter.techtarget.com/news/118820/Get-to-know-your-data-center-with-CMDB.
Lab SKU, "VMware Hands-on Labs—HOL-SDC-1301" Version: 20140321-160709, 2013; http://docs.hol.vmware.com/HOL-2013/holsdc-1301_html_en/ (part 1 of 2).
Lab SKU, "VMware Hands-on Labs—HOL-SDC-1301" Version: 20140321-160709, 2013; http://docs.hol.vmware.com/HOL-2013/holsdc-1301_html_en/ (part 2 of 2).
Lachance, Michael, "Dirty Little Secrets of Application Dependency Mapping," Dec. 26, 2007.
Landman, Yoav, et al., "Dependency Analyzer," Feb. 14, 2008, http://ifrog.com/confluence/display/DA/Home.
Lee, Sihyung, "Reducing Complexity of Large-Scale Network Configuration Management," Ph.D. Dissertation, Carniege Mellon University, 2010.
Li, Ang, et al., "Fast Anomaly Detection for Large Data Centers," Global Telecommunications Conference (GLOBECOM 2010, Dec. 2010, 6 pages.
Li, Bingbong, et al, "A Supervised Machine Learning Approach to Classify Host Roles on Line Using sFlow," in Proceedings of the first edition workshop on High performance and programmable networking, 2013, ACM, New York, NY, USA, 53-60.
Liu, Ting, et al., "Impala: A Middleware System for Managing Autonomic, Parallel Sensor Systems," In Proceedings of the Ninth ACM SIGPLAN Symposium on Principles and Practice of Parallel Programming(PPoPP '03), ACM, New York, NY, USA, Jun. 11-13, 2003, pp. 107-118.
Lu, Zhonghai, et al., "Cluster-based Simulated Annealing for Mapping Cores onto 2D Mesh Networks on Chip," Design and Diagnostics of Electronic Circuits and Systems, pp. 1, 6, 16-18, Apr. 2008.

Matteson, Ryan, "Depmap: Dependency Mapping of Applications Using Operating System Events: a Thesis," Master's Thesis, California Polytechnic State University, Dec. 2010.
Natarajan, Arun, et al., "NSDMiner: Automated Discovery of Network Service Dependencies," Institute of Electrical and Electronics Engineers Infocom, Feb. 2012, 9 pages.
Navaz, A.S. Syed, et al., "Entropy based Anomaly Detection System to Prevent DDoS Attacks in Cloud," International Journal of computer Applications (0975-8887), vol. 62, No. 15, Jan. 2013, pp. 42-47.
Neverfail, "Neverfail IT Continuity Architect," 2015, https://web.archive.org/web/20150908090456/http://www.neverfailgroup.com/products/it-continuity-architect.
Nilsson, Dennis K., et al., "Key Management and Secure Software Updates in Wireless Process Control Environments," In Proceedings of the First ACM Conference on Wireless Network Security (WiSec '08), ACM, New York, NY, USA, Mar. 31-Apr. 2, 2008, pp. 100-108.
Nunnally, Troy, et al., "P3D: A Parallel 3D Coordinate Visualization for Advanced Network Scans," IEEE 2013, Jun. 9-13, 2013, 6 pages.
O'Donnell, Glenn, et al., "The CMDB Imperative: How to Realize the Dream and Avoid the Nightmares," Prentice Hall, Feb. 19, 2009.
Ohta, Kohei, et al., "Detection, Defense, and Tracking of Internet-Wide Illegal Access in a Distributed Manner," 2000, pp. 1-16.
Pathway Systems International Inc., "How Blueprints does Integration," Apr. 15, 2014, 9 pages, http://pathwaysystems.com/company-blog/.
Pathway Systems International Inc., "What is Blueprints?" 2010-2016, http://pathwaysystems.com/blueprints-about/.
Popa, Lucian, et al., "Macroscope: End-Point Approach to Networked Application Dependency Discovery," CoNEXT'09, Dec. 1-4, 2009, Rome, Italy, 12 pages.
Prasad, K. Munivara, et al., "An Efficient Detection of Flooding Attacks to Internet Threat Monitors (ITM) using Entropy Variations under Low Traffic," Computing Communication & Networking Technologies (ICCCNT '12), Jul. 26-28, 2012, 11 pages.
Sachan, Mrinmaya, et al., "Solving Electrical Networks to incorporate Supervision in Random Walks," May 13-17, 2013, pp. 109-110.
Sammarco, Matteo, et al., "Trace Selection for Improved WLAN Monitoring," Aug. 16, 2013, pp. 9-14.
Shneiderman, Ben, et al., "Network Visualization by Semantic Substrates," Visualization and Computer Graphics, vol. 12, No. 5, pp. 733,740, Sep.-Oct. 2006.
Wang, Ru, et al., "Learning directed acyclic graphs via bootstarp aggregating," 2014, 47 pages, http://arxiv.org/abs/1406.2098.
Wang, Yongjun, et al., "A Network Gene-Based Framework for Detecting Advanced Persistent Threats," Nov. 2014, 7 pages.
Woodberg, Brad, "Snippet from Juniper SRX Series" Jun. 17, 2013, 1 page, O'Reilly Media, Inc.
Zhang, Yue, et al., "CANTINA: A Content-Based Approach to Detecting Phishing Web Sites," May 8-12, 2007, pp. 639-648.
Bosch, Greg, "Virtualization," 2010, 33 pages.
Breen, Christopher, "MAC 911, How to dismiss Mac App Store Notifications," Macworld.com, Mar. 24, 2014, 3 pages.
Chou, C.W., et al., "Optical Clocks and Relativity," Science vol. 329, Sep. 24, 2010, pp. 1630-1633.
Huang, Hing-Jie, et al., "Clock Skew Based Node Identification in Wireless Sensor Networks," IEEE, 2008, 5 pages.
Ives, Herbert, E., et al., "An Experimental Study of the Rate of a Moving Atomic Clock," Journal of the Optical Society of America, vol. 28, No. 7, Jul. 1938, pp. 215-226.
Witze, Alexandra, "Special relativity aces time trial, 'Time dilation' predicted by Einstein confirmed by lithium ion experiment," Nature, Sep. 19, 2014, 3 pages.
Zatrochova, Zuzana, "Analysis and Testing of Distributed NoSQL Datastore Riak," Spring, 2015, 76 pages.
Cisco Technology, Inc., "Cisco Lock-and-Key: Dynamic Access Lists," http://www.cisco.com/c/en/us/support/docs/security-vpn/lock-key/7604-13.html; Updated Jul. 12, 2006.

(56) References Cited

OTHER PUBLICATIONS

Al-Fuqaha, Ala, et al., "Internet of Things: A Survey on Enabling Technologies, Protocols, and Applications," IEEE Communication Surveys & Tutorials. vol. 17, No. 4, Nov. 18, 2015, pp. 2347-2376.
Brocade Communications Systems, Inc., "Chapter 5—Configuring Virtual LANs (VLANs)," Jun. 2009, 38 pages.
Cisco Systems, Inc. "Cisco, Nexus 3000 Series NX-OS Release Notes, Release 5.0(3)U3(1)," Feb. 29, 2012, Part No. OL-26631-01, 16 pages.
Cisco Systems, Inc., "Cisco—VPN Client User Guide for Windows," Release 4.6, Aug. 2004, 148 pages.
Cisco Systems, Inc., "Cisco 4710 Application Control Engine Appliance Hardware Installation Guide," Nov. 2007, 66 pages.
Cisco Systems, Inc., "Cisco Data Center Network Architecture and Solutions Overview," Feb. 2006, 19 pages.
Cisco Systems, Inc., "Cisco IOS Configuration Fundamentals Configuration Guide: *Using Autoinstall and Setup*," Release 12.2, first published Apr. 2001, last updated Sep. 2003, 32 pages.
Cisco Systems, Inc., "Cisco VN-Link: Virtualization-Aware Networking," White Paper, Mar. 2009, 10 pages.
Cisco Systems, Inc., "Cisco, Nexus 5000 Series and Cisco Nexus 2000 Series Release Notes, Cisco NX-OS Release 5.1(3)N2(1b), NX-OS Release 5.1(3)N2(1a) and NX-OS Release 5.1(3)N2(1)," Sep. 5, 2012, Part No. OL-26652-03 CO, 24 pages.
Cisco Systems, Inc., "Nexus 3000 Series NX-OS Fundamentals Configuration Guide, Release 5.0(3)U3(1): *Using PowerOn Auto Provisioning*," Feb. 29, 2012, Part No. OL-26544-01, 10 pages.
Cisco Systems, Inc., "Quick Start Guide, Cisco ACE 4700 Series Application Control Engine Appliance," Software Ve740rsion A5(1.0), Sep. 2011, 138 pages.
Cisco Systems, Inc., "Routing and Bridging Guide, Cisco ACE Application Control Engine," Software Version A5(1.0), Sep. 2011, 248 pages.
Cisco Systems, Inc., "VMWare and Cisco Virtualization Solution: Scale Virtual Machine Networking," Jul. 2009, 4 pages.
Cisco Systems, Inc., "Cisco Remote Integrated Service Engine for Citrix NetScaler Appliances and Cisco Nexus 7000 Series Switches Configuration Guide," Last modified Apr. 29, 2014, 78 pages.
Cisco Technology, Inc., "Cisco IOS Software Release 12.4T Features and Hardware Support," Feb. 2009, 174 pages.
Cisco Systems, Inc., "Cisco Application Control Engine (ACE) Troubleshooting Guide—Understanding the ACE Module Architecture and Traffic Flow," Mar. 11, 2011, 6 pages.
Costa, Raul, et al., "An Intelligent Alarm Management System for Large-Scale Telecommunication Companies," In Portuguese Conference on Artificial Intelligence, Oct. 2009, 14 pages.
De Carvalho, Tiago Filipe Rodrigues, "Root Cause Analysis in Large and Complex Networks," Dec. 2008, Repositorio.ul.pt, pp. 1-55.
Foundation for Intelligent Physical Agents, "FIPA Agent Message Transport Service Specification," Dec. 3, 2002, http://www.fipa.org; 15 pages.
Gia, Tuan Nguyen, et al., "Fog Computing in Healthcare Internet of Things: A Case Study on ECG Feature Extraction," 2015 IEEE International Conference on Computer and Information Technology; Ubiquitous Computing and Communications; Dependable, Autonomic and Secure Computing; Pervasive Intelligence and Computing, Oct. 26, 2015, pp. 356-363.
Joseph, Dilip, et al., "Modeling Middleboxes," IEEE Network, Sep./Oct. 2008, pp. 20-25.
Kent, S., et al. "Security Architecture for the Internet Protocol," Network Working Group, Nov. 1998, 67 pages.
Online Collins English Dictionary, 1 page (Year: 2018).
Voris, Jonathan, et al., "Bait and Snitch: Defending Computer Systems with Decoys," Columbia University Libraries, Department of Computer Science, 2013, pp. 1-25.
Bauch, Petr, "Reader's Report of Master's Thesis, Analysis and Testing of Distributed NoSQL Datastore Riak," May 28, 2015, Brno. 2 pages.
Heckman, Sarah, et al., "On Establishing a Benchmark for Evaluating Static Analysis Alert Prioritization and Classification Techniques," IEEE, 2008; 10 pages.
Kim, Myung-Sup, et al. "A Flow-based Method for Abnormal Network Traffic Detection," IEEE, 2004, pp. 599-612.
Thomas, R., "Bogon Dotted Decimal List," Version 7.0, Team Cymru NOC, Apr. 27, 2012, 5 pages.

* cited by examiner

Policy Table 300

| Policy 301 | Source 304 | Destination 308 | Action 316 |
|---|---|---|---|
| 301a | 192.168.1.3 | Geo: France | Allow |
| 301b | Endpoint Group 2 | 3,4,5 | Block |
| 301c | MAC: 01-23-45-67-89-ab | 2 | Allow |
| 301d | BIOS_ID: 3240 | User: John | Allow |
| 301e | Any | Process: Updater.exe | Mark |
| 301f | Any | Any | Block |

FIG. 3

Conditional Policy Table

| Conditional Policy 501 | Endpoint Group 502 | Security Measurement 504 | Security Action 506 |
|---|---|---|---|
| 501a | 1 | 98 | Allow |
| 501b | 3 | ***** | Block |
| 501c | 5 | Trustworthy | Allow |
| 501d | 7,8 | Any | Allow |
| 501e | 9 | 40-55 | Throttle |
| 501f | Any | 0.68 | Block |

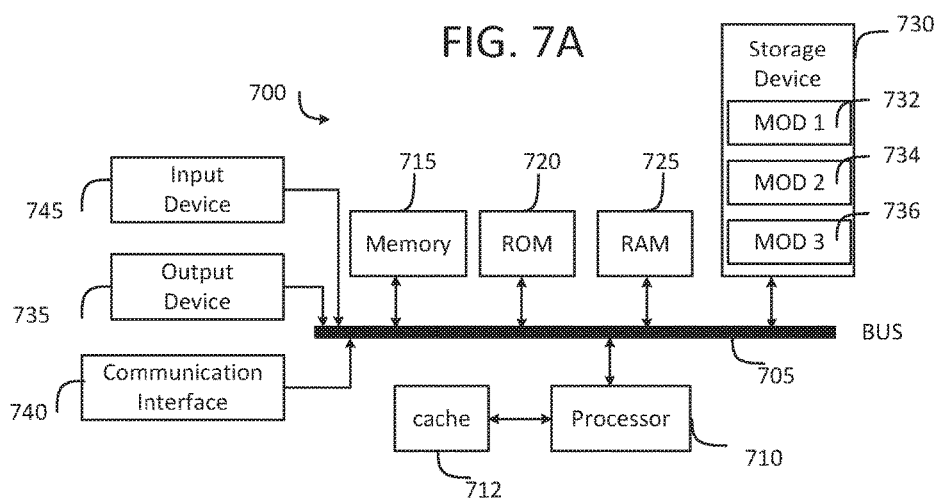
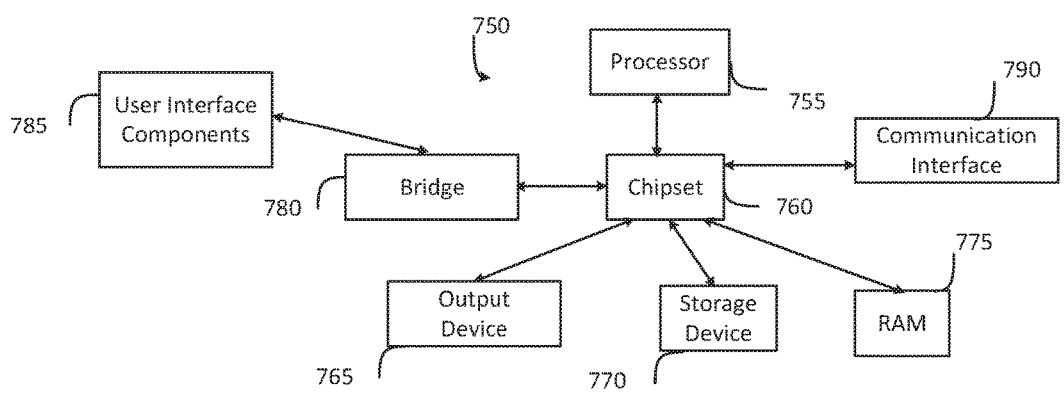

CONDITIONAL POLICIES

RELATED APPLICATIONS

This application claims priority to U.S. Provisional Application No. 62/171,899, entitled "SYSTEM FOR MONITORING AND MANAGING DATACENTERS," filed 5 Jun. 2015, which is incorporated herein by reference in its entirety.

TECHNICAL FIELD

The present technology pertains to network policies and more specifically pertains to network policies that can dynamically change based on security measurements for network endpoints.

BACKGROUND

A network flow can be characterized as one or more packets sharing certain attributes that are sent within a network within a specified period of time. Packet attributes can include a network source address (e.g., Internet Protocol (IP) address, Media Access Control (MAC) address, Domain Name System (DNS) name, or other network address), source port, destination address, destination port, protocol type, class of service, among other characteristics. The network source address may correspond to a first endpoint (e.g., modem, hub, bridge, switch, router, server, workstation, desktop computer, laptop computer, tablet, mobile phone, desk phone, wearable device, or other network or other electronic device) of the network, and the network destination address may correspond to a second endpoint of the network. Network flow data is conventionally collected when a switch or a router forwards a packet, and thus, a switch or router interface can also be a packet attribute used to distinguish network flows. Network policies can determine whether a particular flow is allowed or denied by the network as well as a specific route by which a packet traverses the network. Policies can also be used to mark packets so that certain kinds of traffic receive differentiated service when used in combination with queuing techniques such as those based on priority, fairness, weighted fairness, token bucket, random early detection, round robin, among others. Network administrators typically create these policies and configure network devices to enforce them. When policies require updating, such as when the network is misconfigured or an endpoint becomes the subject of a network attack, a network administrator must generally define new policies, remove or update the priority of existing policies, and propagate these changes throughout the network. This can be a time-consuming task that may be highly susceptible to misconfiguration of the network due to newly defined malformed policies, unknown effects of existing policies, improper removal or modification of existing policies, or other errors.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIG. 3 illustrates an example policy table according to some example embodiments;

FIG. 5 illustrates an example security policy table according to some example embodiments;

FIGS. 7A and 7B illustrate example systems according to some example embodiments.

DESCRIPTION OF EXAMPLE EMBODIMENTS

The detailed description set forth below is intended as a description of various configurations of example embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Conditional policies can be defined that dynamically change based on security measurements of network endpoints. In an example embodiment, a network traffic monitoring system can monitor network flows between the endpoints and quantify how secure those endpoints are based on analysis of the network flows and other data. A conditional policy may be created that establishes one or more first connectivity policies for handling a packet when a security measurement of an endpoint is a first value or first range values, and one or more second connectivity policies for handling the packet when the security measurement of the endpoint is a second value or second range of values. The connectivity policies may include permitting connectivity (e.g., forwarding the packet using a routing protocol such as Routing Information Protocol (RIP), Open Shortest Path First (OSPF), or Enhanced Interior Gateway Routing Protocol (Enhanced IGRP), or other suitable protocol), denying connectivity (e.g., dropping the packet), marking the packet to facilitate quality of service (QoS), redirecting the packet using a specific route, selecting a service graph for the packet (e.g., forwarding the packet through a set of network service functions, such as a firewall, load balancer, wide area network (WAN) optimizer, among other network services), or other network action. When the network traffic monitoring system detects a change to the security measurement of the endpoint, one or more applicable policies can be determined and the system can update policy data for the network to enforce the policies with respect to the endpoint.

Description

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for network policies that can dynamically change based on security measurements for network endpoints.

Figure 1:
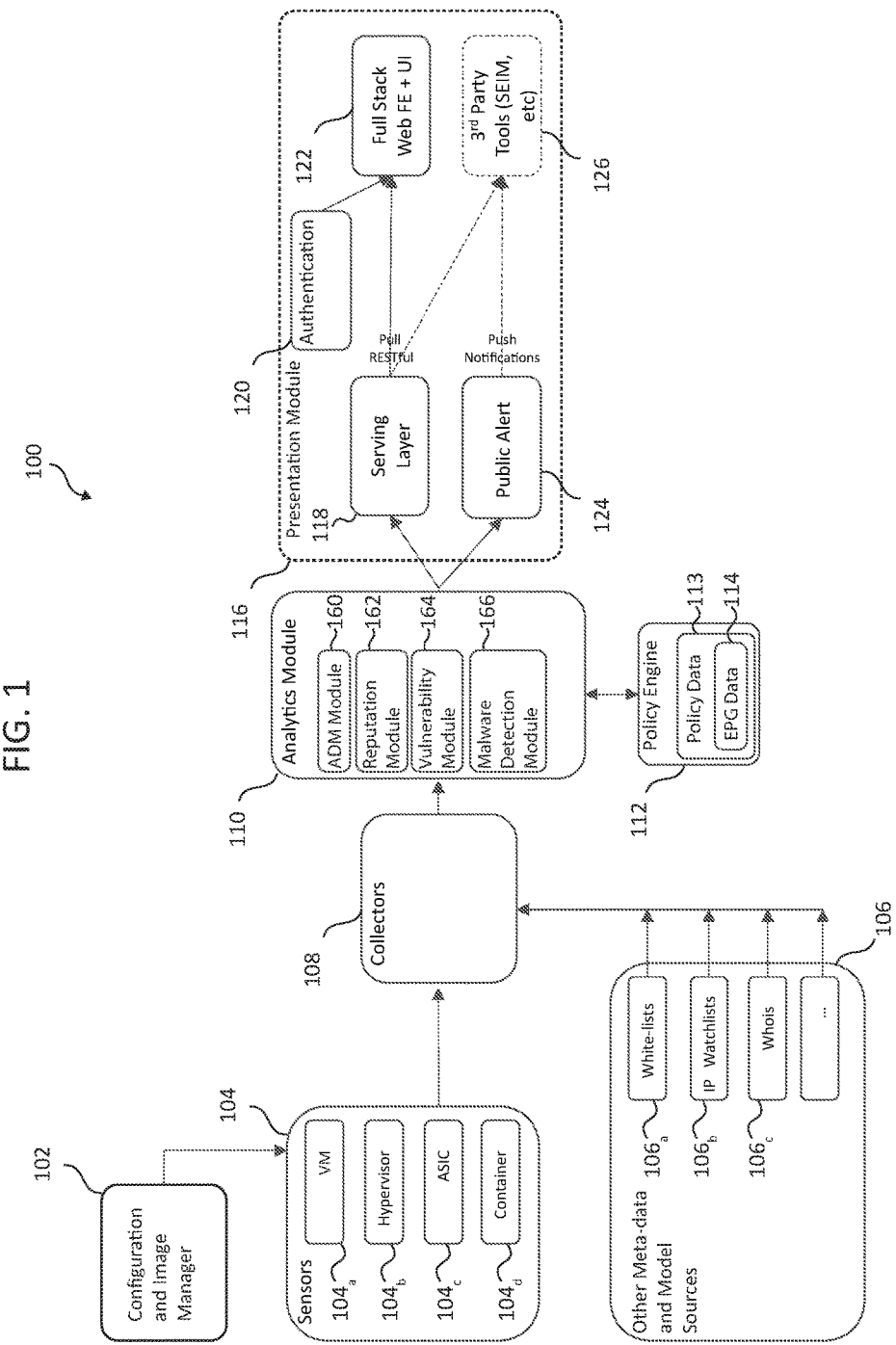
FIG. 1 shows an example network traffic monitoring system according to some example embodiments.

FIG. 1 illustrates an example network traffic monitoring system 100 according to some example embodiments. Network traffic monitoring system 100 can include configuration and image manager 102, sensors 104, external data sources 106, collectors 108, analytics module 110, policy engine 112, and presentation module 116. These modules may be implemented as hardware and/or software components. Although FIG. 1 illustrates an example configuration of the various components of network traffic monitoring system 100, those of skill in the art will understand that the components of network traffic monitoring system 100 or any system described herein can be configured in a number of different ways and can include any other type and number of components. For example, sensors 104 and collectors 108 can belong to one hardware and/or software module or multiple separate modules. Other modules can also be combined into fewer components and/or further divided into more components.

Configuration and image manager 102 can provision and maintain sensors 104. In some example embodiments, sensors 104 can reside within virtual machine images, and configuration and image manager 102 can be the component that also provisions virtual machine images.

Configuration and image manager 102 can configure and manage sensors 104. When a new virtual machine is instantiated or when an existing one is migrated, configuration and image manager 102 can provision and configure a new sensor on the machine. In some example embodiments configuration and image manager 102 can monitor the health of sensors 104. For instance, configuration and image manager 102 may request status updates or initiate tests. In some example embodiments, configuration and image manager 102 can also manage and provision virtual machines.

In some example embodiments, configuration and image manager 102 can verify and validate sensors 104. For example, sensors 104 can be provisioned a unique ID that is created using a one-way hash function of its basic input/output system (BIOS) universally unique identifier (UUID) and a secret key stored on configuration and image manager 102. This UUID can be a large number that is difficult for an imposter sensor to guess. In some example embodiments, configuration and image manager 102 can keep sensors 104 up to date by installing new versions of their software and applying patches. Configuration and image manager 102 can obtain these updates automatically from a local source or the Internet.

Sensors 104 can reside on nodes of a data center network (e.g., virtual partition, hypervisor, physical server, switch, router, gateway, other network device, other electronic device, etc.). In general, a virtual partition may be an instance of a virtual machine (VM) (e.g., VM 104a), sandbox, container (e.g., container 104c), or any other isolated environment that can have software operating within it. The software may include an operating system and application software. For software running within a virtual partition, the virtual partition may appear to be a distinct physical server.

In some example embodiments, a hypervisor (e.g., hypervisor 104b) may be a native or "bare metal" hypervisor that runs directly on hardware, but that may alternatively run under host software executing on hardware. Sensors 104 can monitor communications to and from the nodes and report on environmental data related to the nodes (e.g., node IDs, statuses, etc.). Sensors 104 can send their records over a high-speed connection to collectors 108 for storage. Sensors 104 can comprise a piece of software (e.g., running on a VM, container, virtual switch, hypervisor, physical server, or other device), an application-specific integrated circuit (ASIC) (e.g., a component of a switch, gateway, router, standalone packet monitor, or other network device including a packet capture (PCAP) module or similar technology), or an independent unit (e.g., a device connected to a network device's monitoring port or a device connected in series along a main trunk of a datacenter). It should be understood that various software and hardware configurations can be used as sensors 104. Sensors 104 can be lightweight, thereby minimally impeding normal traffic and compute resources in a datacenter. Sensors 104 can "sniff" packets being sent over its host network interface card (NIC) or individual processes can be configured to report traffic to sensors 104. This sensor structure allows for robust capture of granular (i.e., specific) network traffic data from each hop of data transmission.

As sensors 104 capture communications, they can continuously send network traffic data to collectors 108. The network traffic data can relate to a packet, a collection of packets, a flow, a group of flows, etc. The network traffic data can also include other details such as the VM BIOS ID, sensor ID, associated process ID, associated process name, process user name, sensor private key, geo-location of a sensor, environmental details, etc. The network traffic data can include information describing the communication on all layers of the Open Systems Interconnection (OSI) model. For example, the network traffic data can include signal strength (if applicable), source/destination MAC address, source/destination IP address, protocol, port number, encryption data, requesting process, a sample packet, etc.

In some example embodiments, sensors 104 can preprocess network traffic data before sending to collectors 108. For example, sensors 104 can remove extraneous or duplicative data or they can create a summary of the data (e.g., latency, packets and bytes sent per flow, flagged abnormal activity, etc.). In some example embodiments, sensors 104 can be configured to only capture certain types of connection information and disregard the rest. Because it can be overwhelming for a system to capture every packet in a network, in some example embodiments, sensors 104 can be configured to capture only a representative sample of packets (e.g., every 1,000th packet or other suitable sample rate).

Sensors 104 can send network traffic data to one or multiple collectors 108. In some example embodiments, sensors 104 can be assigned to a primary collector and a secondary collector. In other example embodiments, sensors 104 are not assigned a collector, but can determine an optimal collector through a discovery process. Sensors 104 can change where they send their network traffic data if their environments change, such as if a certain collector experiences failure or if a sensor is migrated to a new location and becomes closer to a different collector. In some example embodiments, sensors 104 can send different types of network traffic data to different collectors. For example, sensors 104 can send network traffic data related to one type of process to one collector and network traffic data related to another type of process to another collector.

Collectors 108 can serve as a repository for the data recorded by sensors 104. In some example embodiments, collectors 108 can be directly connected to a top of rack switch. In other example embodiments, collectors 108 can be located near an end of row switch. Collectors 108 can be located on or off premises. It will be appreciated that the placement of collectors 108 can be optimized according to various priorities such as network capacity, cost, and system responsiveness. In some example embodiments, data storage of collectors 108 is located in an in-memory database, such as dashDB by IBM. This approach benefits from rapid random access speeds that typically are required for analytics software. Alternatively, collectors 108 can utilize solid state drives, disk drives, magnetic tape drives, or a combination of the foregoing according to cost, responsiveness, and size requirements. Collectors 108 can utilize various database structures such as a normalized relational database or NoSQL database.

In some example embodiments, collectors 108 may only serve as network storage for network traffic monitoring system 100. In other example embodiments, collectors 108 can organize, summarize, and preprocess data. For example, collectors 108 can tabulate how often packets of certain sizes or types are transmitted from different nodes of a data center. Collectors 108 can also characterize the traffic flows going to and from various nodes. In some example embodiments, collectors 108 can match packets based on sequence numbers, thus identifying traffic flows and connection links. In some example embodiments, collectors 108 can flag anomalous data. Because it would be inefficient to retain all data indefinitely, in some example embodiments, collectors 108 can periodically replace detailed network traffic flow data with consolidated summaries. In this manner, collectors 108 can retain a complete dataset describing one period (e.g., the past minute or other suitable period of time), with a smaller dataset of another period (e.g., the previous 2-10 minutes or other suitable period of time), and progressively consolidate network traffic flow data of other periods of time (e.g., day, week, month, year, etc.). By organizing, summarizing, and preprocessing the network traffic flow data, collectors 108 can help network traffic monitoring system 100 scale efficiently. Although collectors 108 are generally referred to herein in the plurality, it will be appreciated that collectors 108 can be implemented using a single machine, especially for smaller datacenters.

In some example embodiments, collectors 108 can receive data from external data sources 106, such as security reports, white-lists (106a), IP watchlists (106b), whois data (106c), or out-of-band data, such as power status, temperature readings, etc.

In some example embodiments, network traffic monitoring system 100 can include a wide bandwidth connection between collectors 108 and analytics module 110. Analytics module 110 can include application dependency (ADM) module 160, reputation module 162, vulnerability module 164, malware detection module 166, etc., to accomplish various tasks with respect to the flow data collected by sensors 104 and stored in collectors 108. In some example embodiments, network traffic monitoring system 100 can automatically determine network topology. Using network traffic flow data captured by sensors 104, network traffic monitoring system 100 can determine the type of devices existing in the network (e.g., brand and model of switches, gateways, machines, etc.), physical locations (e.g., latitude and longitude, building, datacenter, room, row, rack, machine, etc.), interconnection type (e.g., 10 Gb Ethernet, fiber-optic, etc.), and network characteristics (e.g., bandwidth, latency, etc.). Automatically determining the network topology can assist with integration of network traffic monitoring system 100 within an already established datacenter. Furthermore, analytics module 110 can detect changes of network topology without the need of further configuration.

Analytics module 110 can determine dependencies of components within the network using ADM module 160. For example, if component A routinely sends data to component B but component B never sends data to component A, then analytics module 110 can determine that component B is dependent on component A, but A is likely not dependent on component B. If, however, component B also sends data to component A, then they are likely interdependent. These components can be processes, virtual machines, hypervisors, VLANs, etc. Once analytics module 110 has determined component dependencies, it can then form a component ("application") dependency map. This map can be instructive when analytics module 110 attempts to determine a root cause of a failure (because failure of one component can cascade and cause failure of its dependent components). This map can also assist analytics module 110 when attempting to predict what will happen if a component is taken offline. Additionally, analytics module 110 can associate edges of an application dependency map with expected latency, bandwidth, etc. for that individual edge.

Analytics module 110 can establish patterns and norms for component behavior. For example, it can determine that certain processes (when functioning normally) will only send a certain amount of traffic to a certain VM using a small set of ports. Analytics module can establish these norms by analyzing individual components or by analyzing data coming from similar components (e.g., VMs with similar configurations). Similarly, analytics module 110 can determine expectations for network operations. For example, it can determine the expected latency between two components, the expected throughput of a component, response times of a component, typical packet sizes, traffic flow signatures, etc. In some example embodiments, analytics module 110 can combine its dependency map with pattern analysis to create reaction expectations. For example, if traffic increases with one component, other components may predictably increase traffic in response (or latency, compute time, etc.).

In some example embodiments, analytics module 110 can use machine learning techniques to identify security threats to a network using malware detection module 166. For example, malware detection module 166 can be provided with examples of network states corresponding to an attack and network states corresponding to normal operation. Malware detection module 166 can then analyze network traffic flow data to recognize when the network is under attack. In some example embodiments, the network can operate within a trusted environment for a time so that analytics module 110 can establish baseline normalcy. In some example embodiments, analytics module 110 can contain a database of norms and expectations for various components. This database can incorporate data from sources external to the network (e.g., external sources 106). Analytics module 110 can then create access policies for how components can interact using policy engine 112. In some example embodiments, policies can be established external to network traffic monitoring system 100 and policy engine 112 can detect the policies and incorporate them into analytics module 110. A network administrator can manually tweak the policies. Policies can dynamically change and be conditional on events. These policies can be enforced by the components depending on a network control scheme implemented by a network. Policy engine 112 can maintain these policies and receive user input to change the policies.

Policy engine 112 can configure analytics module 110 to establish or maintain network policies. For example, policy engine 112 may specify that certain machines should not intercommunicate or that certain ports are restricted. A network and security policy controller (not shown) can set the parameters of policy engine 112. In some example embodiments, policy engine 112 can be accessible via presentation module 116. In some example embodiments, policy engine 112 can include policy data 112. In some example embodiments, policy data 112 can include EPG data 114, which can include the mapping of EPGs to IP addresses and/or MAC addresses. In some example embodiments, policy data 112 can include policies for handling data packets.

In some example embodiments, analytics module 110 can simulate changes in the network. For example, analytics module 110 can simulate what may result if a machine is taken offline, if a connection is severed, or if a new policy is implemented. This type of simulation can provide a network administrator with greater information on what policies to implement. In some example embodiments, the simulation may serve as a feedback loop for policies. For example, there can be a policy that if certain policies would affect certain services (as predicted by the simulation) those policies should not be implemented. Analytics module 110 can use simulations to discover vulnerabilities in the datacenter. In some example embodiments, analytics module 110 can determine which services and components will be affected by a change in policy. Analytics module 110 can then take necessary actions to prepare those services and components for the change. For example, it can send a notification to administrators of those services and components, it can initiate a migration of the components, it can shut the components down, etc.

In some example embodiments, analytics module 110 can supplement its analysis by initiating synthetic traffic flows and synthetic attacks on the datacenter. These artificial actions can assist analytics module 110 in gathering data to enhance its model. In some example embodiments, these synthetic flows and synthetic attacks are used to verify the integrity of sensors 104, collectors 108, and analytics module 110. Over time, components may occasionally exhibit anomalous behavior. Analytics module 110 can analyze the frequency and severity of the anomalous behavior to determine a reputation score for the component using reputation module 162. Analytics module 110 can use the reputation score of a component to selectively enforce policies. For example, if a component has a high reputation score, the component may be assigned a more permissive policy or more permissive policies; while if the component frequently violates (or attempts to violate) its relevant policy or policies, its reputation score may be lowered and the component may be subject to a stricter policy or stricter policies. Reputation module 162 can correlate observed reputation score with characteristics of a component. For example, a particular virtual machine with a particular configuration may be more prone to misconfiguration and receive a lower reputation score. When a new component is placed in the network, analytics module 110 can assign a starting reputation score similar to the scores of similarly configured components. The expected reputation score for a given component configuration can be sourced outside of the datacenter. A network administrator can be presented with expected reputation scores for various components before installation, thus assisting the network administrator in choosing components and configurations that will result in high reputation scores.

Some anomalous behavior can be indicative of a misconfigured component or a malicious attack. Certain attacks may be easy to detect if they originate outside of the datacenter, but can prove difficult to detect and isolate if they originate from within the datacenter. One such attack could be a distributed denial of service (DDOS) where a component or group of components attempt to overwhelm another component with spurious transmissions and requests. Detecting an attack or other anomalous network traffic can be accomplished by comparing the expected network conditions with actual network conditions. For example, if a traffic flow varies from its historical signature (packet size, TCP header options, etc.) it may be an attack.

In some cases, a traffic flow may be expected to be reported by a sensor, but the sensor may fail to report it. This situation could be an indication that the sensor has failed or become compromised. By comparing the network traffic flow data from multiple sensors 104 spread throughout the datacenter, analytics module 110 can determine if a certain sensor is failing to report a particular traffic flow.

Presentation module 116 can include serving layer 118, authentication module 120, web front end 122, public alert module 124, and third party tools 126. In some example embodiments, presentation module 116 can provide an external interface for network monitoring system 100. Using presentation module 116, a network administrator, external software, etc. can receive data pertaining to network monitoring system 100 via a webpage, application programming interface (API), audiovisual queues, etc. In some example embodiments, presentation module 116 can preprocess and/or summarize data for external presentation. In some example embodiments, presentation module 116 can generate a webpage. As analytics module 110 processes network traffic flow data and generates analytic data, the analytic data may not be in a human-readable form or it may be too large for an administrator to navigate. Presentation module 116 can take the analytic data generated by analytics module 110 and further summarize, filter, and organize the analytic data as well as create intuitive presentations of the analytic data.

Serving layer 118 can be the interface between presentation module 116 and analytics module 110. As analytics module 110 generates reports, predictions, and conclusions, serving layer 118 can summarize, filter, and organize the information that comes from analytics module 110. In some example embodiments, serving layer 118 can also request raw data from a sensor or collector.

Web frontend 122 can connect with serving layer 118 to present the data from serving layer 118 in a webpage. For example, web frontend 122 can present the data in bar charts, core charts, tree maps, acyclic dependency maps, line graphs, tables, etc. Web frontend 122 can be configured to allow a user to "drill down" on information sets to get a filtered data representation specific to the item the user wishes to drill down to. For example, individual traffic flows, components, etc. Web frontend 122 can also be configured to allow a user to filter by search. This search filter can use natural language processing to analyze the user's input. There can be options to view data relative to the current second, minute, hour, day, etc. Web frontend 122 can allow a network administrator to view traffic flows, application dependency maps, network topology, etc.

In some example embodiments, web frontend 122 may be solely configured to present information. In other example embodiments, web frontend 122 can receive inputs from a network administrator to configure network traffic monitoring system 100 or components of the datacenter. These instructions can be passed through serving layer 118 to be sent to configuration and image manager 102 or policy engine 112. Authentication module 120 can verify the identity and privileges of users. In some example embodiments, authentication module 120 can grant network administrators different rights from other users according to established policies.

Public alert module 124 can identify network conditions that satisfy specified criteria and push alerts to third party tools 126. Public alert module 124 can use analytic data generated or accessible through analytics module 110. One example of third party tools 126 is a security information and event management system (SIEM). Third party tools 126 may retrieve information from serving layer 118 through an API and present the information according to the SIEM's user interfaces.

Figure 2:
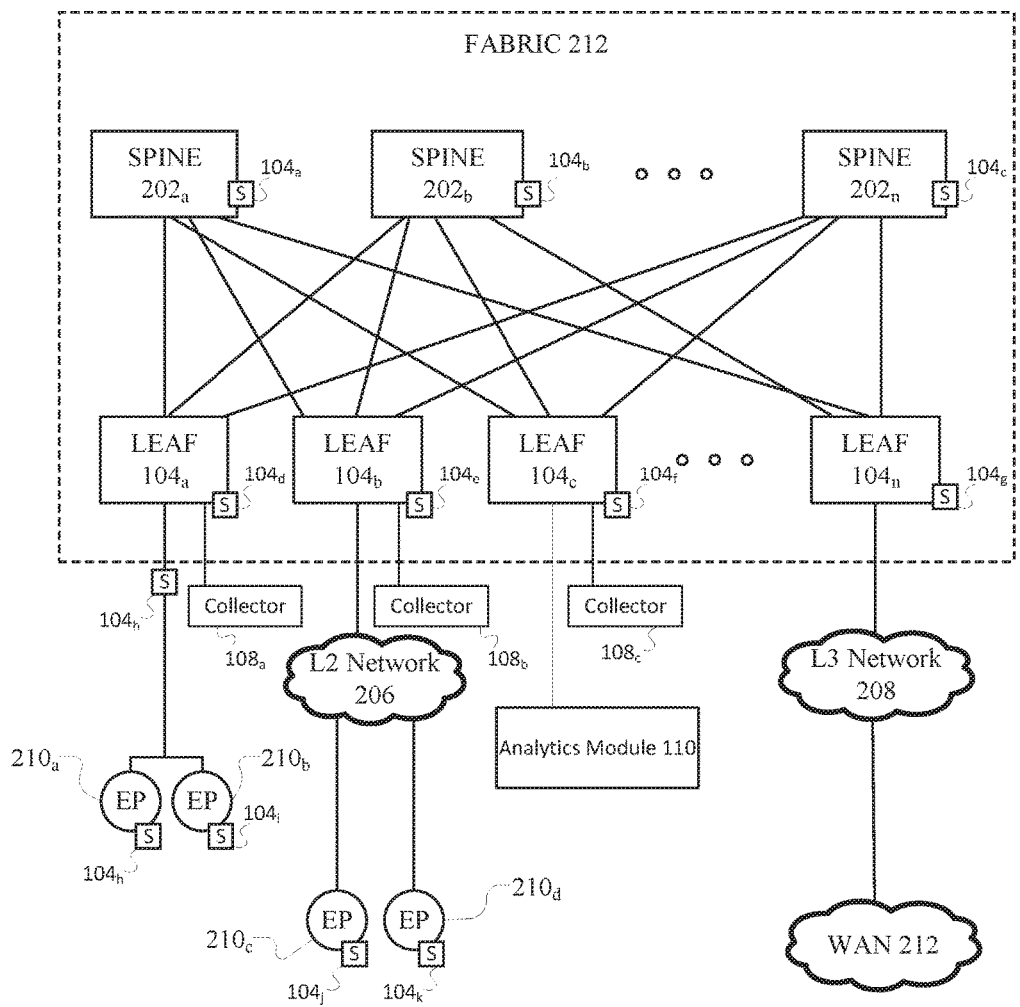
FIG. 2 illustrates an example network environment according to some example embodiments.

FIG. 2 illustrates an example network environment 200 according to some example embodiments. It should be understood that, for the network environment 100 and any environment discussed herein, there can be additional or fewer nodes, devices, links, networks, or components in similar or alternative configurations. Example embodiments with different numbers and/or types of clients, networks, nodes, cloud components, servers, software components, devices, virtual or physical resources, configurations, topologies, services, appliances, deployments, or network devices are also contemplated herein. Further, network environment 200 can include any number or type of resources, which can be accessed and utilized by clients or tenants. The illustrations and examples provided herein are for clarity and simplicity.

Network environment 200 can include network fabric 212, layer 2 (L2) network 206, layer 3 (L3) network 208, endpoints 210a, 210b, . . . , and 210d (collectively, "204"). Network fabric 212 can include spine switches 202a, 202b, . . . , 202n (collectively, "202") connected to leaf switches 204a, 204b, 204c, . . . , 204n (collectively, "204"). Spine switches 202 can connect to leaf switches 204 in network fabric 212. Leaf switches 204 can include access ports (or non-fabric ports) and fabric ports. Fabric ports can provide uplinks to spine switches 202, while access ports can provide connectivity for devices, hosts, endpoints, VMs, or other electronic devices (e.g., endpoints 204), internal networks (e.g., L2 network 206), or external networks (e.g., L3 network 208).

Leaf switches 204 can reside at the edge of network fabric 212, and can thus represent the physical network edge. In some cases, leaf switches 204 can be top-of-rack switches configured according to a top-of-rack architecture. In other cases, leaf switches 204 can be aggregation switches in any particular topology, such as end-of-row or middle-of-row topologies. Leaf switches 204 can also represent aggregation switches, for example.

Network connectivity in network fabric 212 can flow through leaf switches 204. Here, leaf switches 204 can provide servers, resources, VMs, or other electronic devices (e.g., endpoints 210), internal networks (e.g., L2 network 206), or external networks (e.g., L3 network 208), access to network fabric 212, and can connect leaf switches 204 to each other. In some example embodiments, leaf switches 204 can connect endpoint groups (EPGs) to network fabric 212, internal networks (e.g., L2 network 206), and/or any external networks (e.g., L3 network 208). EPGs can be used in network environment 200 for mapping applications to the network. In particular, EPGs can use a grouping of application endpoints in the network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries. For example, each EPG can connect to network fabric 212 via leaf switches 204.

Endpoints 210 can connect to network fabric 212 via leaf switches 204. For example, endpoints 210a and 210b can connect directly to leaf switch 204a, which can connect endpoints 210a and 210b to network fabric 212 and/or any other one of leaf switches 204. Endpoints 210c and 210d can connect to leaf switch 204b via L2 network 206. Endpoints 210c and 210d and L2 network 206 are examples of LANs. LANs can connect nodes over dedicated private communications links located in the same general physical location, such as a building or campus.

Wide area network (WAN) 212 can connect to leaf switches 204c or 204d via L3 network 208. WANs can connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and endpoints.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective size of each network. Endpoints 210 can include any communication device or component, such as a computer, server, hypervisor, virtual machine, container, process (e.g., running on a virtual machine), switch, router, gateway, host, device, external network, etc. In some example embodiments, endpoints 210 can include a server, hypervisor, process, or switch configured with virtual tunnel endpoint (VTEP) functionality which connects an overlay network with network fabric 212. The overlay network may allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), can provide a traffic encapsulation scheme which allows network traffic to be carried across L2 and L3 networks over a logical tunnel. Such logical tunnels can be originated and terminated through VTEPs. The overlay network can host physical devices, such as servers, applications, endpoint groups, virtual segments, virtual workloads, etc. In addition, endpoints 210 can host virtual workload(s), clusters, and applications or services, which can connect with network fabric 212 or any other device or network, including an internal or external network. For example, endpoints 210 can host, or connect to, a cluster of load balancers or an EPG of various applications.

Network environment 200 can also integrate a network traffic monitoring system, such as the one shown in FIG. 1. For example, as shown in FIG. 2, the network traffic monitoring system can include sensors 104a, 104b, ..., 104n (collectively, "104"), collectors 108a, 108b, ... 108n (collectively, "108"), and analytics module 110. In some example embodiments, spine switches 202 do not have sensors 104. Analytics module 110 can receive and process network traffic data collected by collectors 108 and detected by sensors 104 placed on nodes located throughout network environment 200. In some example embodiments, analytics module 110 can be implemented in an active-standby model to ensure high availability, with a first analytics module functioning in a primary role and a second analytics module functioning in a secondary role. If the first analytics module fails, the second analytics module can take over control. Although analytics module 110 is shown to be a standalone network appliance in FIG. 2, it will be appreciated that analytics module 110 can also be implemented as a VM image that can be distributed onto a VM, a cluster of VMs, a software as a service (SaaS), or other suitable distribution model in various other example embodiments. In some example embodiments, sensors 104 can run on endpoints 210, leaf switches 204, spine switches 202, in-between network elements (e.g., sensor 104h), etc. In some example embodiments, leaf switches 204 can each have an associated collector 108. For example, if leaf switch 204 is a top of rack switch then each rack can contain an assigned collector 108.

Although network fabric 212 is illustrated and described herein as an example leaf-spine architecture, one of ordinary skill in the art will readily recognize that the subject technology can be implemented based on any network topology, including any data center or cloud network fabric. Indeed, other architectures, designs, infrastructures, and variations are contemplated herein. For example, the principles disclosed herein are applicable to topologies including three-tier (including core, aggregation, and access levels), fat tree, mesh, bus, hub and spoke, etc. It should be understood that sensors and collectors can be placed throughout the network as appropriate according to various architectures.

Systems and methods according to some example embodiments provide for network policies that can dynamically change based on security measurements for network endpoints. In some example embodiments, a reputation module (e.g., reputation module 162) can determine the security measurements for network endpoints. FIG. 3 illustrates an example policy table 300 according to some example embodiments. Policy table 300 can include policies 301a-301f (collectively, "301") for enforcement in a network. Each policy 301 can specify packet attributes 302 such as source 304, destination 308, and action 316 to be applied to a packet when the packet matches each of packet attributes 302. A packet attribute can be a description of a certain characteristic that can be matched with a communication (e.g., a subnet or port range). Source 304 and destination 308 packet attributes can include a MAC address (e.g., source for policy 301c), IP address (e.g., source for policy 301a), endpoint 210, endpoint group (e.g., source for policy 301b), user (e.g., destination for policy 301d), process (e.g., name, PID as in destination for policy 301e), subnet, geographical location (e.g., destination for policy 301a), etc.—including any combination of the foregoing. In some example embodiments, the source and destination are of different types (e.g., source is a MAC address while destination is an endpoint group) while in some example embodiments one or both of source and destination are not specified.

Policy table 300 may be information provided to a network administrator or other user to more easily associate certain endpoints with their applicable policies. In other embodiments, there may be a policy table listing only source EPGs and destination EPGs, and a separate data structure or separate data structures for associating EPGs to MAC addresses (e.g., source for policy 301c), IP addresses (e.g., source for policy 301a), users (e.g., destination for policy 301d), processes (e.g., name, PID as in destination for policy 301e), subnets, geographical locations (e.g., destination for policy 301a), etc. By way of example, policy 301a could match a communication sent by an EPG, defined as the endpoint having a particular IP address (e.g., source for policy 301a), to an EPG defined as endpoints located in the geographic location of France (e.g., destination for policy 301a). The resultant action could be to allow the communication. As another example, policy 301b could match a communication initiated by any endpoint 210 associated with endpoint group 2 to endpoint labelled 3, 4, or 5. The resultant action 316 could be to block the communication.

In some example embodiments, there is a single policy table 300 that is identical across an entire network; alternatively, policy table 300 can be distributed such that parts of it are stored and applied differently on different parts of the network. For example, policies 301 pertaining to one LAN can be stored on a switch associated with that LAN but not stored on other switches that are not on that LAN.

Policy table 300 can be a list, tree, map, matrix, etc. of policies 301. In some example embodiments, the relative position of policies 301 is relevant to their enforcement. For example, enforcement can include going through policy table until a policy 301 matches the communication detected. If policy 300 is a tree structure, enforcement can include traversing the tree by matching policy packet attributes until a match is determined.

A network defined by policies that allow a communication between source and destination or otherwise default to denial of the communication can be called a whitelist policy system while a network defined by policies that block a communication between source and destination or otherwise default to allowing the communication can be called a blacklist system. In some example embodiments, policy table may only include whitelist policies and all other communications can be blocked; in some embodiments, policy table 300 can only contain blacklist policies and all other communications can be allowed. In some situations, policies may conflict; for example, a general policy may allow a certain communication while a more specific policy may block the communication. In some such example embodiments, various resolution techniques can be implemented; for example, the policies can be ordered according to importance and the first matching policy can be enforced with respect to the communication. In some example embodiments, the most specific policy can be implemented; specific meaning that the match is according to a high degree of granularity. For example, a policy (or EPG) that pertains to an IP address of 192.168.1.5 is more specific than a policy or EPG that pertains to an IP subnet of 192.168.1.0/24 because the former describes a single IP address instead of the latter, which is applicable to 254 IP addresses. Specificity can be determined by any of the packet attributes described in a policy, such as IP address, port, etc.

In some embodiments, a policy can include a counter of how many communications are described by the policy during a certain time. After a certain number of communications within a certain time are detected, the policy can activate, invoking action 316.

Action 316 can be the action that is applied to a communication when the communication matches a corresponding policy. For example, action 316 can be to permit or allow the flow described in policy 301 (i.e., forward the communication), block or deny the flow described in the policy (i.e., drop the communication), limit the bandwidth consumed by the flow, log the flow, "mark" the flow for quality of service (QoS) (e.g., set a lower or higher priority for the flow), redirect the flow (e.g., to avoid critical paths), copy the flow, etc. In some example embodiments, action 316 can have an expiration time or date. For example, it can only take the designated action (e.g., allow, block, mark, etc.) for a certain amount of time before the communication is dropped. Similarly, action 316 can have designated times of applicability, for example only during peak hours. A policy can be over-inclusive or under-inclusive. For example, in certain situations, a whitelist policy may allow communications that are potentially harmful to the network while a blacklist policy 301 can block communications that are permitted by the network.

Figure 4:
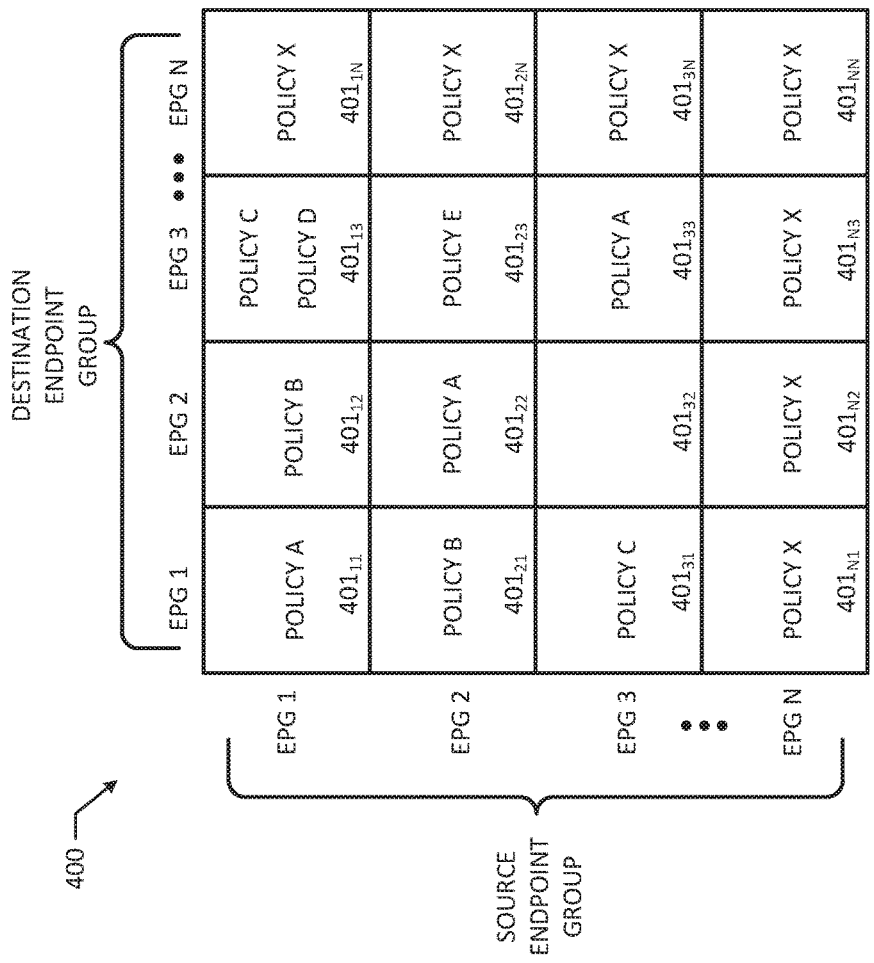
FIG. 4 illustrates an example policy matrix according to some example embodiments.

In some example embodiments, a policy table can be organized as a policy matrix of n-dimensions, each dimension corresponding to a packet attribute. FIG. 4 illustrates an example policy matrix 400 according to some example embodiments. Policy matrix 400 can include one dimension for the source (e.g., Source Endpoint Group) and a second dimension for the destination (e.g., Destination Endpoint Group). When using such a policy matrix, a certain destination EPG (e.g., EPG 3) and a certain source EPG (e.g., EGP2) can invoke policy result 401 (e.g., result $401_{23}$). Policy result 401 can include no policy (e.g., result $401_{32}$), one policy (e.g., result $401_{12}$), or more than one policy (e.g., result $401_{13}$). FIG. 5 illustrates an example conditional policy table 500 according to some example embodiments. In some example embodiments, conditional policy table 500 can include conditional policies 501 defined by, for example, endpoint group (EPG) 502, security measurement 504, and security action 506. If security measurement 504 of an endpoint is described by security measurement 504 of conditional policy 501, the corresponding security action 506 can be implemented. In some example embodiments, this can be accomplished by pushing a policy 301 to policy engine 112 that corresponds to action 506. In some example embodiments, security action 506 can be implemented by changing the EPG of the endpoint.

Security measurement 504 can be represented by a number on a scale (e.g., 0-100), a decimal number from 0-1, a binary result (e.g., "untrustworthy" or "trusted"), a relative assessment of ordinality (e.g., "more trustworthy than endpoints x, y, and z but less trustworthy than m, n, and o"), an assigned security measurement group (e.g., endpoints within "Endpoint Group Danger" are less trustworthy than those in "Endpoint Group Safe"), etc. In some example embodiments, security measurement 504 can include multiple values describing different security parameters. For example, security measurement 504 can include a value for its trustworthiness as a source, a value for its trustworthiness as a destination, a value for its general reliability, a historical security measurement 504, etc. In conditional policy table 500, the packet attribute for security measurement 504 can describe a range of security measurements (e.g., for conditional policy 501e the security measurement is "40-55").

In some example embodiments, security measurement 504 can be inherited or influenced from various sources. For example, an endpoint's security measurement 504 can be inherited from an assigned endpoint group or from a template that was used to create the endpoint. For example, external sources such as watch-lists can influence an endpoint's security measurement 504. Similarly, one endpoint's security measurement 504 can influence other endpoints' security measurement 504 (e.g., endpoints that were created using the same template can influence each other's security measurement 504).

In some example embodiments, security measurement 504 can describe a combined security measurement 504 between two endpoints. For example, a source endpoint and a destination endpoint might both independently have favorable security measurements 504, however in combination they may have a low combined security measurement 504. Once security measurement 504 between the two endpoints is below a certain threshold, it can be desirable to block communications between the two endpoints. For example, if 99% of all traffic from the source endpoint can be permitted and similarly 99% of all traffic to the destination endpoint can be permitted, their security measurements 504 may be relatively high; however, a majority of traffic between the two endpoints may potentially be harmful to the network. This could be reflected in a lower combined security measurement 504.

In some example embodiments, a policy engine (e.g., policy engine 112 of FIG. 1) can determine whether policies (e.g., the actions described in conditional policies 501 of FIG. 5 and policies 301 of FIG. 3) have been enforced in the network. The policy engine can receive network flow data captured by sensors (e.g., sensors 104) to determine whether flows were allowed, dropped, marked, redirected, copied, etc., by the network. Switches, routers, gateways, tunnels, endpoints, hypervisors, sensors, etc., or a combination of the foregoing can enforce policy. In some example embodiments, certain network nodes will only deal with certain policies. For example, a layer 2 (of the OSI model) switch may be ignorant of transport layer details of a communication (e.g., IP addresses and ports); such a switch can disregard higher layer policies to more efficiently process only relevant policies.

In some example embodiments, the policy engine may determine when a change in an endpoint's security measurement should cause the network to update its policy data to reflect the new state of the endpoint. As used herein, policy data can include a mapping of endpoints to EPGs as well as policies that the network must enforce. In some example embodiments, the policy engine can create a new policy from the relevant conditional policy and cause the policy to be published. In some situations, an applicable policy of a conditional policy that is no longer applicable may be removed. In other situations, the network may be capable of resolving policy conflicts, such as enforcing more specific policies or EPGs before less specific policies or EPGs and/or enforcing more restrictive policies before more permissive polices, and the applicable policy can be defined such that it will be applied before a policy that is no longer applicable. In other example embodiments, an applicable policy of a conditional policy may already be in place, and the policy engine can cause an endpoint's EPG to be modified such that the applicable conditional policy is now enforced.

Figure 6:
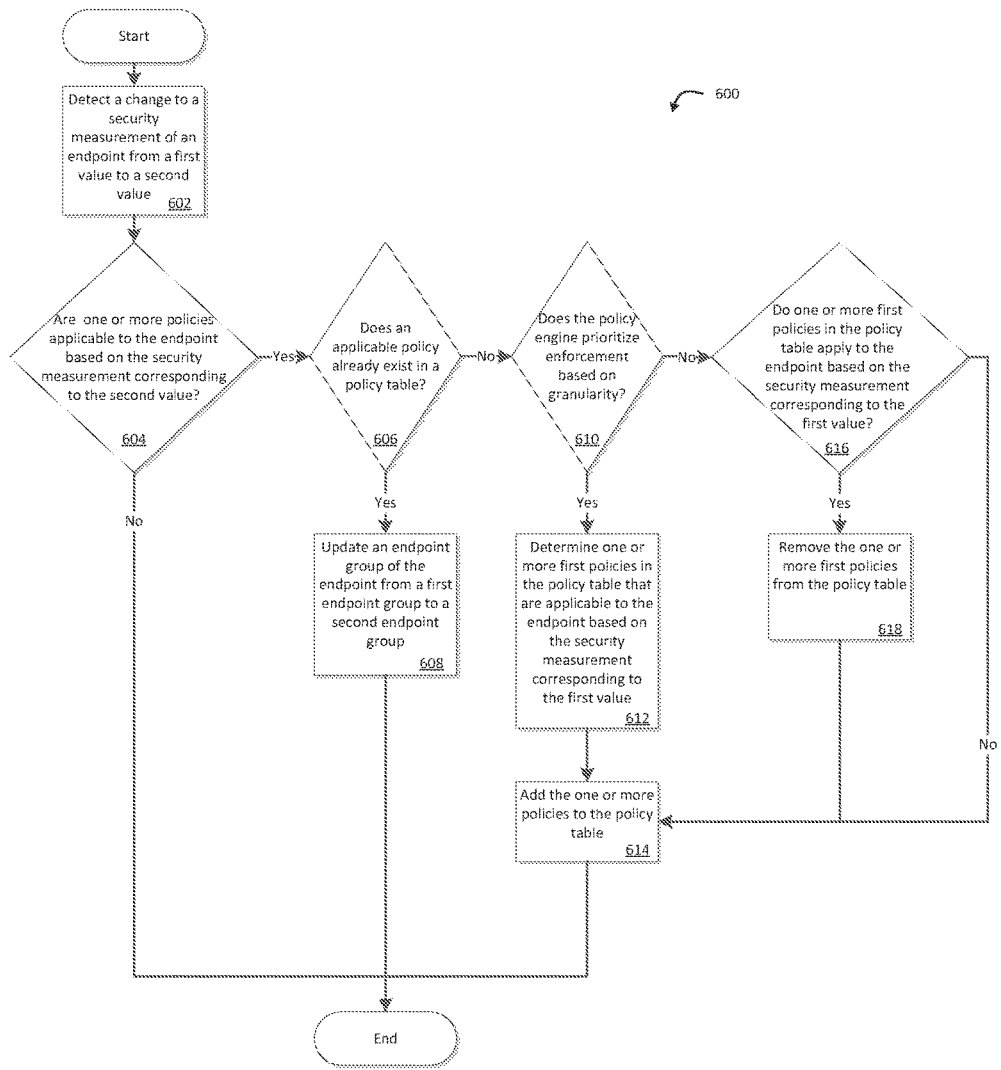
FIG. 6 illustrates an example process for implementing conditional policies according to some example embodiments.

FIG. 6 illustrates an example process 600 according to some example embodiments. A system (including, e.g., analytics module 110, policy engine 112, etc.) performing the method depicted in process 600 can start and then detect a change to a security measurement of an endpoint from a first value to a second value (step 602). For example, the security measurement may correspond to a reputation score for the endpoint. The security measurement of the endpoint may drop below a first predefined threshold or become greater than the first predefined threshold or a second predefined threshold. The system can then determine whether one or more policies are applicable to the endpoint 210 based on the security measurement 504 corresponding to the second value (step 604). If yes, the system can determine whether an applicable policy already exists in a policy table (step 606). If one does, the system can update an endpoint group of the first endpoint from a first endpoint group to a second endpoint group (step 608). If one does not, the system can determine whether the policy engine prioritizes enforcement based on granularity (or specificity) (step 610). If the system determines "yes" at step 610, it can determine one or more first policies in the policy table one or more policies that are applicable to the endpoint based on the security measurement corresponding to the first value (step 612) and add the one or more policies to the one or more policies to the policy table (step 614). If step 610 yields a "no", the system can determine whether one or more first policies in the policy table apply to the endpoint based on the security measurement corresponding to the first value (step 616). It should be understood that "one or more first policies" can, in some example embodiments, be distinct from "one or more policies". If step 616 yields a "yes", the system can remove the one or more first policies from the policy table (step 618) and continue to step 614. If step 616 yields a "no", the system can continue to step 614. The system can then update policy data for the network to determine whether the one or more policies are enforced with respect to the endpoint (step 606). The process can then end.

In some example embodiments, the system can periodically or continuously calculate the security measurement of an endpoint; alternatively, another component can calculate the security measurement of the endpoint and the system can retrieve the security measurement from that component. In some example embodiments, this other component can notify the system whenever the security measurement changes or drops below a certain amount.

In some example embodiments, the system can determine that a sufficient amount of time has passed with the endpoint remaining at the first value of the security measurement, instead of detecting a transition to a second value. Because the first value can correspond to a limited set of allowed communications, the endpoint may be constrained such that it is unable to sufficiently demonstrate that it has been fixed and should receive an improved security measurement. The system can accommodate a probationary period during which the endpoint can rehabilitate its security measurement. If the security measurement is unchanged after the probationary period, policy data can be updated to enforce a more strict policy or policies. This time period can also be effective to allow the endpoint to "cool off." For example, an endpoint may suffer from a momentary malfunction that causes it to receive an undesirable security measurement for only a short period of time while the endpoint corrects the problem.

In some example embodiments, step 604 can include creating a new policy or selecting an existing policy. For example, the system can have a list of first policies in one form (e.g., conditional policy 501) that are applicable based on security measurements whereas a policy table may not accommodate the first policies in that form. The system can then create a new policy that is informed by one or more first policies. In step 606, a policy table can be integrated within the system or can be an external module. Similarly, the system can enforce the policies contained within the policy table or another module can enforce the policies. In some example embodiments, policy table 300 contains security measurement 504. The module that enforces the policies within policy table 300 can then determine if the security measurement 504 qualifies the communication for activating a policy 301 within policy table 300. In some example embodiments, if policy table 300 does not contain security measurement 504, a separate conditional policy table 500 can be referenced in combination with policy table 300 to determine if a certain communication is allowed or disallowed according to the combination of policy table 300 and conditional policy table 500.

In some example embodiments, an endpoint can be associated with a first endpoint group. A first group of policies can be applicable to this first endpoint group. When the system determines that the security measurement of the endpoint has dropped below a first threshold or increased above the first threshold or a second threshold, the system can associate the endpoint with a second endpoint group. This second endpoint group can be associated with a second group of policies and at least one policy in the second group of policies can be different from the first group of policies. Analytics module 110 can remove the endpoint from the first endpoint group. Alternatively, the two assigned endpoint groups can have an associated priority such that policies of the second endpoint group are applied when there is a conflict between policies.

In some example embodiments, the endpoint can be associated with a first group of policies that correspond to the first security measurement and, upon changing to a second security measurement, the endpoint can be associated with a second group of policies. In some example embodiments, the endpoint can retains its association with the first group of policies although at least one of the second group of policies might be in conflict with the first group of policies. In some example embodiments, one of the policies in conflict can have an increased level of specificity in comparison to the other policies. A policy with increased specificity can be associated with a smaller collection of endpoints, ports, protocols, etc. Thus, the policy with increased specificity can be applied instead of the conflicting other policies. In some example embodiments, policies are applied in a sequential order even if they are in conflict. For example, the enforcement module can process policies sequentially until an applicable policy is found. Thus, if a first applicable policy explicitly allows a communication and a subsequent applicable policy denies the communication, the first policy will be applied and the communication will be allowed.

In some example embodiments, when the endpoint's security measurement changes, policies that were associated with the first security measurement are not applicable to the second security measurement. Analytics module 110 can determine if one or more first policies that are applicable to the endpoint based on the security measurement corresponding to the first value and remove the one or more first policies from the policy table.

In some example embodiments, when an endpoint's security measurement goes below a certain value it can be considered in need of repair. Analytics module can update a policy table to allow communications with a remediation server while blocking some other communications. The remediation server can take action to fix the endpoint, for example by modifying the configuration of the endpoint or re-imaging the endpoint. Analytics module can modify a state of the endpoint based on network traffic flow between the endpoint and a second endpoint, wherein the one or more policies include a policy that allows the network traffic flow. When the endpoint's security measurement exhibits a second change to an acceptable amount (e.g., a third security measurement), analytics module can update the policy table to enforce one or more second policies that are applicable to the endpoint corresponding to the first or third security measurement.

FIG. 7A and FIG. 7B illustrate example systems according to some example embodiments. The more appropriate embodiment will be apparent to those of ordinary skill in the art when practicing the present technology. Persons of ordinary skill in the art will also readily appreciate that other system embodiments are possible.

FIG. 7A illustrates a conventional system bus computing system architecture 700 wherein the components of the system are in electrical communication with each other using a bus 705. Example system 700 includes a processing unit (CPU or processor) 710 and a system bus 705 that couples various system components including the system memory 715, such as read only memory (ROM) 770 and random access memory (RAM) 775, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 737, module 7 734, and module 3 736 stored in storage device 730, configured to control the processor 910 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 775, read only memory (ROM) 770, and hybrids thereof.

The storage device 730 can include software modules 737, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

FIG. 7B illustrates an example computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that example systems 700 and 750 can have more than one processor 710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some example embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

The invention claimed is:

1. A method comprising:
   detecting, via a computer having a processor configured to execute computer readable instructions, a change to a security measurement of an endpoint in a network from a first value to a second value, the security measurement of the endpoint represented by a number on a scale, a decimal number from 0-1, a binary result, or multiple values describing different security parameters;
   determining, via the computer, one or more policies that are applicable to the endpoint based on the security measurement corresponding to the second value; and
   updating, via the computer, policy data for the network to enforce the one or more policies with respect to the endpoint.

2. The method of claim 1, wherein updating the policy data includes:
   updating an endpoint group of the endpoint from a first endpoint group to a second endpoint group,
   wherein the one or more policies are applicable to the second endpoint group and not applicable to the first endpoint group.

3. The method of claim 1, wherein updating the policy data includes:
   determining one or more first policies in a policy table that are applicable to the endpoint based on the security measurement corresponding to the first value; and
   adding the one or more policies to the policy table,
   wherein the one or more policies are prioritized over the one or more first policies based on the one or more policies corresponding to a level of specificity exceeding that of the one or more first policies.

4. The method of claim 1, wherein updating the policy data includes:
   determining one or more first policies in a policy table that are applicable to the endpoint based on the security measurement corresponding to the first value; adding the one or more policies to the policy table of the network; and removing the one or more first policies from the policy table.

5. The method of claim 1, further comprising:
   remediating the endpoint based on network traffic flow between the endpoint and a second endpoint, wherein the one or more policies include a policy that allows the network traffic flow.

6. The method of claim 5, further comprising:
   detecting a second change to the security measurement of the endpoint from the second value to the first value or a third value;
   determining one or more second policies that are applicable to the endpoint based on the security measurement corresponding to the first value or the third value; and
   updating policy data of the network to enforce the one or more second policies with respect to the endpoint.

7. The method of claim 1, wherein the one or more policies are whitelist rules, and updating the policy data includes:
   determining one or more second policies that are applicable to the endpoint based on the security measurement corresponding to the first value;
   removing the one or more second policies from a policy table; and
   adding the one or more policies to the policy table to allow a network traffic flow between the endpoint and a second endpoint.

8. The method of claim 1, wherein the one or more policies are blacklist rules, and updating the policy data includes:
   determining one or more second policies that are applicable to the endpoint based on the security measurement corresponding to the first value;
   adding the one or more second policies to a policy table; and
   removing the one or more policies to deny a network traffic flow between the endpoint and a second endpoint.

9. The method of claim 1, further comprising:
   receiving a packet including a source or a destination corresponding to the endpoint;
   determining a network action for the packet based on the one or more policies; and
   performing the network action,
   wherein the network action is one of forwarding the packet, dropping the packet, logging the packet, marking the packet, selecting a service graph for the packet, redirecting the packet, or copying the packet.

10. The method of claim 1, wherein the policy data includes a policy table applicable to a first collection of endpoints of the network and not applicable to a second collection of endpoints of the network.

11. The method of claim 1, wherein the policy data includes a policy table applicable to an entirety of the network.

12. A non-transitory computer-readable medium having computer readable instructions that, when executed by a processor of a computer, cause the computer to:
- define a conditional policy for an endpoint in a network, the conditional policy corresponding to at least a first policy for the endpoint having a first value for a security measurement and a second policy for the endpoint having a second value for the security measurement, the security measurement represented by a number on a scale, a decimal number from 0-1, a binary result, or multiple values describing different security parameters;
- determine that the security measurement of the endpoint corresponds to the first value;
- add the first policy to a policy table of the network; and
- enforce the first policy.

13. The non-transitory computer-readable medium of claim 12, wherein the computer readable instructions further cause the computer to:
- update an endpoint group of the endpoint from a first endpoint group to a second endpoint group,
- wherein the first policy is applicable to the second endpoint group and not applicable to the first endpoint group.

14. The non-transitory computer-readable medium of claim 12, wherein,
- the policy table includes the second policy, and
- the first policy is enforced instead of the second policy based on the first policy corresponding to a level of specificity exceeding that of the second policy.

15. The non-transitory computer-readable medium of claim 12, wherein the computer readable instructions further cause the computer to:
- remove the second policy from the policy table.

16. The non-transitory computer-readable medium of claim 12, wherein the computer readable instructions further cause the computer to:
- modify a state of the endpoint based on network traffic flow between the endpoint and a remediation server,
- wherein the first policy allows the network traffic flow between the endpoint and the remediation server.

17. The non-transitory computer-readable medium of claim 16, wherein the computer readable instructions further cause the computer to:
- detect a change to the security measurement of the endpoint from the first value to the second value;
- obtain the second policy based on the security measurement corresponding to the first value; and
- update the policy table to enforce the second policy with respect to the endpoint.

18. A system comprising:
a processor; and
a memory including instructions that when executed by the processor, cause the system to:
- define a policy for an endpoint group in a network corresponding to a first value range for a first security measurement;
- detect a second security measurement corresponding to an endpoint not associated with the endpoint group;
- determine that the second security measurement is within the first value range; and
- assign the endpoint to the endpoint group,
wherein,
- the first security measurement and/or the second security measurement is represented by a number on a scale, a decimal number from 0-1, a binary result, or multiple values describing different security parameters.

19. The system of claim 18, wherein the policy is a whitelist rule, and the instructions further cause the system to:
- determine one or more second policies that are applicable to the endpoint based on the first security measurement corresponding to a third value, wherein the one or more second policies are configured to block a network traffic flow between the endpoint and a second endpoint; and
- allow, based on at least the policy, the network traffic flow.

20. The system of claim 18, wherein the policy is a blacklist rule, and the instructions further cause the system to:
- determine one or more second policies that are applicable to the endpoint based on the security measurement corresponding to a third value, wherein the one or more second policies are configured to allow a network traffic flow between the endpoint and a second endpoint; and
- block, based on at least the policy, the network traffic flow.

* * * * *